United States Patent
Abe et al.

(10) Patent No.: US 11,968,466 B2
(45) Date of Patent: Apr. 23, 2024

(54) SOLID-STATE IMAGING DEVICE, METHOD FOR DRIVING SOLID-STATE IMAGING DEVICE, AND ELECTRONIC APPARATUS

(71) Applicant: Brillnics Singapore Pte. Ltd., Singapore (SG)

(72) Inventors: Naoyuki Abe, Tokyo (JP); Keita Murase, Tokyo (JP); Takahiro Matsuzawa, Tokyo (JP); Shinichiro Matsuo, Tokyo (JP); Shingo Sanada, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/880,945

(22) Filed: Aug. 4, 2022

(65) Prior Publication Data
US 2023/0038227 A1 Feb. 9, 2023

(30) Foreign Application Priority Data
Aug. 6, 2021 (JP) .................... 2021-129796

(51) Int. Cl.
*H04N 25/75* (2023.01)
*H04N 25/71* (2023.01)

(52) U.S. Cl.
CPC ........... *H04N 25/75* (2023.01); *H04N 25/745* (2023.01)

(58) Field of Classification Search
CPC .... H04N 25/75; H04N 25/745; H04N 25/616; H04N 25/78; G06F 7/62; G06F 7/504
See application file for complete search history.

(56) References Cited

U.S. PATENT DOCUMENTS

| | | | | |
|---|---|---|---|---|
| 7,952,510 B2* | 5/2011 | Shimomura | ........ | H03M 1/1023 341/169 |
| 2010/0194949 A1* | 8/2010 | Hisamatsu | ............. | H04N 25/65 348/E5.091 |
| 2021/0314518 A1* | 10/2021 | Ushinaga | ............. | H04N 25/772 |

FOREIGN PATENT DOCUMENTS

| | | | | |
|---|---|---|---|---|
| EP | 2197118 A1 * | 6/2010 | ............. | H03K 23/62 |
| EP | 2197118 A1 | 6/2010 | | |
| JP | 2019-062398 A | 4/2019 | | |

OTHER PUBLICATIONS

European Patent Office, Extended European Search Report issued in EP Patent Application No. 22188941.3, dated Jan. 2, 2023, pp. 1-10.

* cited by examiner

*Primary Examiner* — Nhan T Tran
(74) *Attorney, Agent, or Firm* — Pillsbury Winthrop Shaw Pittman LLP

(57) ABSTRACT

A solid-state imaging device, a method for driving a solid-state imaging device, and an electronic apparatus are provided that are capable of reducing memory circuits of a column reading system, so that the column reading system can achieve a reduced layout area and eventually a reduced size. A column reading circuit includes an AD converting part and a calculating part. The AD converting part is configured to analog-to-digital convert a read-out reset signal and a read-out signal of a pixel signal read to a vertical signal line into an n-bit digital pixel signal. The calculating part includes an n-bit asynchronous counter including a retention circuit with a control logic function, which is configured to obtain a difference between an n-bit read-out reset signal and an n-bit read-out signal produced by the AD conversion performed by the AD converting part.

12 Claims, 21 Drawing Sheets

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2021-129796, filed on Aug. 6, 2021, the contents of which are incorporated herein.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

The CMOS image sensors include, for each pixel, a photodiode (a photoelectric conversion element) and a floating diffusion (FD) amplifier having a floating diffusion (FD). The mainstream design of the reading operation in the CMOS image sensors is a column parallel output processing performed by selecting a row in a pixel array and reading the pixels simultaneously in the column direction.

The CMOS image sensors can be constituted, for example, by 4-transistor (4Tr) pixels. The 4Tr pixels each include, for one photodiode (photoelectric conversion element), one transfer transistor serving as a transfer element, one reset transistor serving as a reset element, one source follower transistor serving as a source follower element and one selection transistor serving as a selection element.

The transfer transistor is selected by a control signal TG and remains selected and in the conduction state during a predetermined transfer period to transfer to the floating diffusion FD the charges (electrons) produced by the photoelectric conversion by the photodiode and then stored therein. The reset transistor is selected by a control signal RST and remains selected and in the conduction state during a predetermined reset period to reset the floating diffusion FD to the potential of a power supply line. The selection transistor remains selected and in the conduction state during a read-out scan. In this way, the source follower transistor outputs, to the vertical signal line LSGN, a read-out signal Pixout of a column output, which is obtained by converting the charges in the floating diffusion FD into a voltage signal.

For example, in a read-out scan period, the floating diffusion FD is reset to the potential of the power supply line in a reset period, and the charges in the floating diffusion FD are then converted by the source follower transistor into a voltage signal, and the voltage signal is output to the vertical signal line LSGN as a read-out reset signal (voltage) VRST. Subsequently, in a predetermined transfer period, the charges (electrons) produced by the photoelectric conversion by the photodiode and then stored therein are transferred to the floating diffusion FD. The charges in the floating diffusion FD are converted by the source follower transistor to a voltage signal, and the voltage signal is output to the vertical signal line LSGN as a read-out signal (voltage) VSIG. The output signals from the pixel are processed to produce a differential signal (VSIG−VRST).

FIG. 1 schematically shows an example configuration of a column reading system in a CMOS image sensor. FIG. 2 is a timing chart including parts (A) to (E) to briefly illustrate a column read-out operation performed by a column reading circuit of FIG. 1.

In the column reading system 1 in FIG. 1, a pixel signal Pixout read from a pixel array 2 is output to a vertical signal line LSGN and captured by a column reading circuit 3 via a sample-and-hold switch SW-SH for AD conversion. In the column reading circuit 3, the read-out reset signal (voltage) VRST is converted by an AD converting part 4 into an N-bit digital signal, and the N-bit digital signal is stored in a reset memory 5 via a switch SW-RS. Subsequently, in the column reading circuit 3, the read-out signal (voltage) VSIG is converted by the AD converting part 4 into an N-bit digital signal, and the N-bit digital signal is stored in a signal memory 6 via the switch SW-RS. Following this, a calculating part 7 uses the information stored in the reset memory 5 and the signal memory 6 to obtain a differential signal (VSIG−VRST).

In the CMOS image sensor, the difference ΔV1 between (i) the black level LB1 indicated by the read-out reset signal VRST and (ii) the signal level LS indicated by the read-out signal VSIG of the pixel signal Pixout represents luminance information, as show in FIG. 1.

In the CMOS image sensor, the black level LB1 and the signal level LS are produced with a time lag therebetween at the pixel output (Pixout), and they are respectively AD converted. Referring to FIG. 2, the black level LB1 is converted into a digital black level signal RST ADC, and the signal level LS is converted into a digital signal SIG ADC. In order to obtain the difference between the two pieces of data that are produced with a time lag therebetween, the data output from the AD converting part 4 needs to be temporarily stored in the memories 5 and 6.

In the CMOS image sensor described above, the AD converting part and the memory circuits are narrow due to restriction imposed by the width of the pixels, so that the circuits are stacked on each other vertically. Since the reset (RST) circuit part, the signal (SIG) circuit part, and the two stages of the memories are staked on each other vertically, a large layout area is required. Accordingly, the entire chip needs to have a large area, which is disadvantageous from the perspective of the cost. The CMOS image sensor may be configured such that two of the rows are accessible simultaneously and in parallel for the purposes of high-speed processing. In this case, two reading circuits sandwich the array of pixels vertically, so that the total area of the reading circuits is doubled, as shown in FIG. 3.

SUMMARY

The present invention is designed to provide a solid-state imaging device, a method for driving a solid-state imaging device, and an electronic apparatus that are capable of reducing the memory circuits of the column reading system, so that the column reading system can achieve a reduced layout area and eventually a reduced size.

A first aspect of the present invention provides a solid-state imaging device including a pixel part having pixels arranged in a matrix pattern, where each pixel is configured to perform photoelectric conversion; and a reading circuit having an analog-to-digital (AD) conversion function for analog-to-digital converting a pixel signal read out from the each pixel onto a signal line as a voltage signal. The pixel signal read out from the each pixel includes a read-out reset signal and a read-out signal sequentially read from the each pixel, the reading circuit includes: an AD converting part for analog-to-digital converting the read-out reset signal and the read-out signal included in the pixel signal read onto the signal line into an n-bit digital pixel signal; and a calculating part including an n-bit asynchronous counter having a retention circuit with a control logic function for obtaining a difference between an n-bit read-out reset signal and an n-bit read-out signal produced by the AD conversion performed by the AD converting part, and the calculating part: places the asynchronous counter in a non-operational state, captures, in synchronization with a capture signal, each bit of the n-bit read-out reset signal produced by the AD conversion performed by the AD converting part, and holds the read-out reset signal in the retention circuit; and subsequently places the asynchronous counter in an operational state, captures, in synchronization with a capture signal, each bit of the n-bit read-out signal produced by the AD conversion performed by the AD converting part, adds the captured read-out signal to the read-out reset signal held in the retention circuit, performs counting and performs an operation between a negative version of the read-out reset signal and a positive version of the read-out signal.

A second aspect of the present invention provides a method for driving a solid-state imaging device including a pixel part having pixels arranged in a matrix pattern, where each pixel is configured to perform photoelectric conversion; and a reading circuit having an analog-to-digital (AD) conversion function for analog-to-digital converting a pixel signal read out from the each pixel onto a signal line as a voltage signal. The pixel signal read out from the each pixel includes a read-out reset signal and a read-out signal sequentially read from the each pixel, the reading circuit includes: an AD converting part for analog-to-digital converting the read-out reset signal and the read-out signal included in the pixel signal read onto the signal line into an n-bit digital pixel signal; and a calculating part including an n-bit asynchronous counter having a retention circuit with a control logic function for obtaining a difference between an n-bit read-out reset signal and an n-bit read-out signal produced by the AD conversion performed by the AD converting part, and the calculating part: places the asynchronous counter in a non-operational state, captures, in synchronization with a capture signal, each bit of the n-bit read-out reset signal produced by the AD conversion performed by the AD converting part, and holds the read-out reset signal in the retention circuit; and subsequently places the asynchronous counter in an operational state, captures, in synchronization with a capture signal, each bit of the n-bit read-out signal produced by the AD conversion performed by the AD converting part, adds the captured read-out signal to the read-out reset signal held in the retention circuit, performs counting and performs an operation between a negative version of the read-out reset signal and a positive version of the read-out signal.

A third aspect of the present invention provides an electronic apparatus including a solid-state imaging device; and an optical system for forming a subject image on the solid-state imaging device. The solid-state imaging device includes: a pixel part having pixels arranged in a matrix pattern, where each pixel is configured to perform photoelectric conversion; and a reading circuit having an analog-to-digital (AD) conversion function for analog-to-digital converting a pixel signal read out from the each pixel onto a signal line as a voltage signal. The pixel signal read out from the each pixel includes a read-out reset signal and a read-out signal sequentially read from the each pixel, the reading circuit includes: an AD converting part for analog-to-digital converting the read-out reset signal and the read-out signal included in the pixel signal read onto the signal line into an n-bit digital pixel signal; and a calculating part including an n-bit asynchronous counter having a retention circuit with a control logic function for obtaining a difference between an n-bit read-out reset signal and an n-bit read-out signal produced by the AD conversion performed by the AD converting part, and the calculating part: places the asynchronous counter in a non-operational state, captures, in synchronization with a capture signal, each bit of the n-bit read-out reset signal produced by the AD conversion performed by the AD converting part, and holds the read-out reset signal in the retention circuit; and subsequently places the asynchronous counter in an operational state, captures, in synchronization with a capture signal, each bit of the n-bit read-out signal produced by the AD conversion performed by the AD converting part, adds the captured read-out signal to the read-out reset signal held in the retention circuit, performs counting and performs an operation between a negative version of the read-out reset signal and a positive version of the read-out signal.

Advantageous Effects

The present invention can reduce the memory circuits of the column reading system, so that the column reading system can achieve a reduced layout area and eventually a reduced total size.

DESCRIPTION OF THE PREFERRED EMBODIMENTS

Embodiments of the present invention will be hereinafter described with reference to the drawings.

First Embodiment

Figure 1:
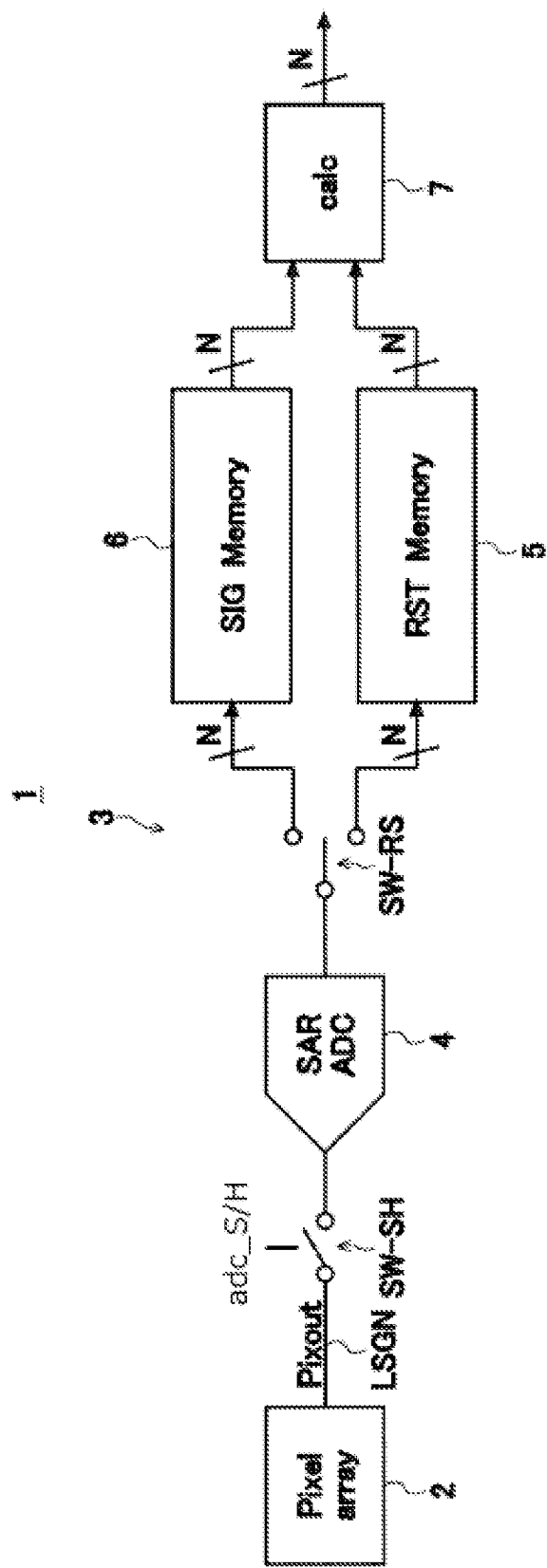
FIG. 1 schematically shows an example configuration of a column reading system in a CMOS image sensor.
Figure 2:
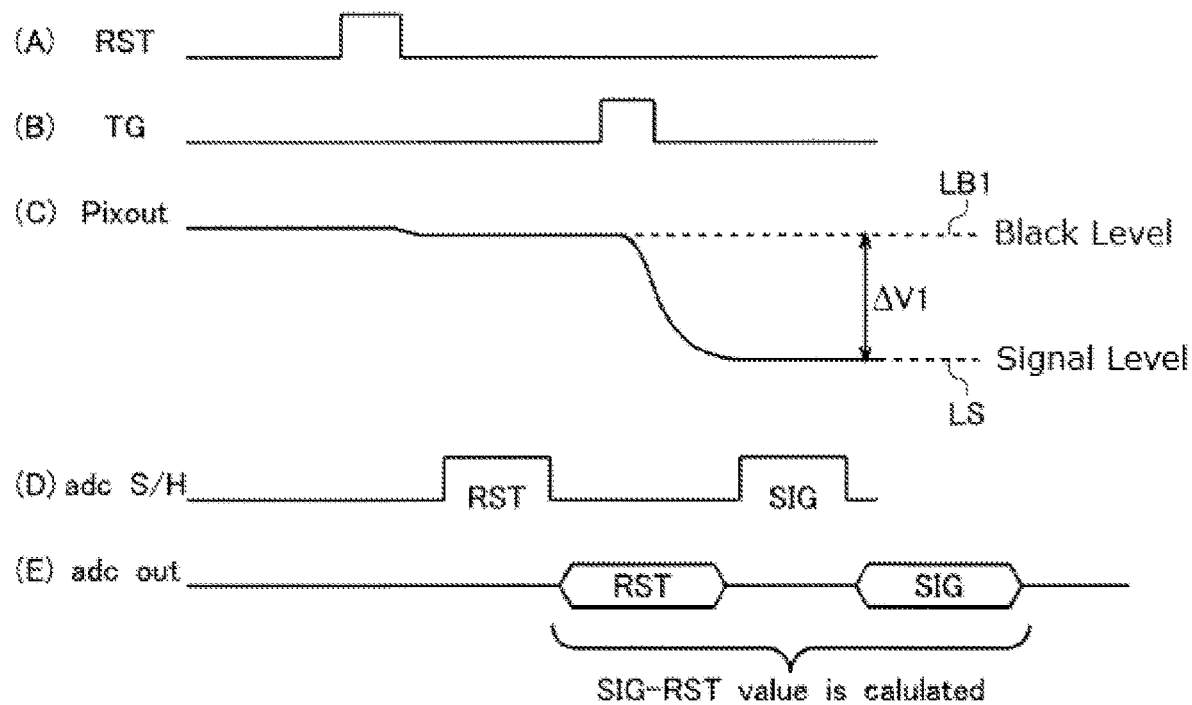
FIG. 2 is a timing chart to briefly illustrate a column read-out operation performed by a column reading circuit of FIG. 1.
Figure 3:
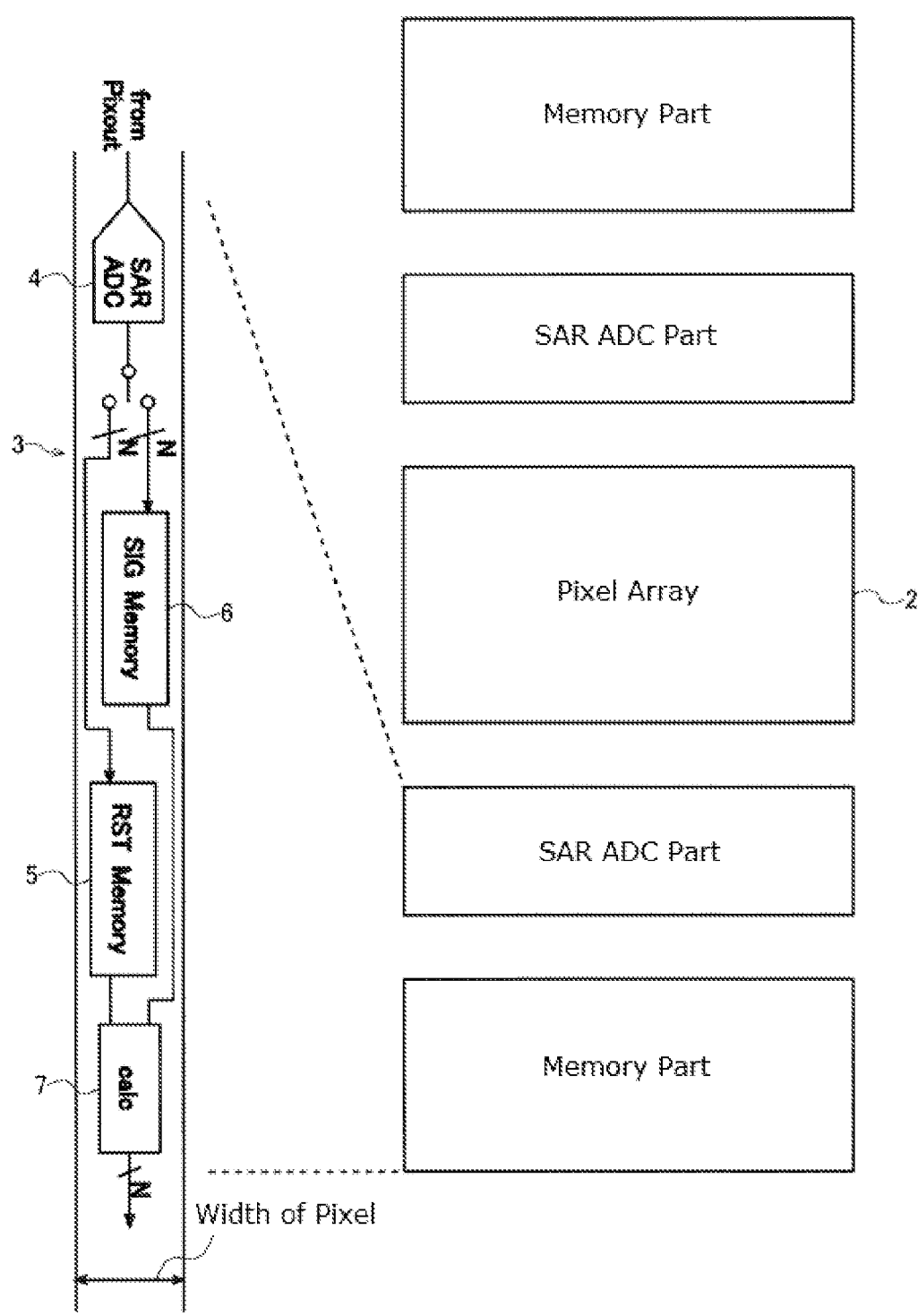
FIG. 3 illustrates a conventional column read-out system, where signals are read from pixels in two vertically different directions, and shows how this affects the layout area.
Figure 4:
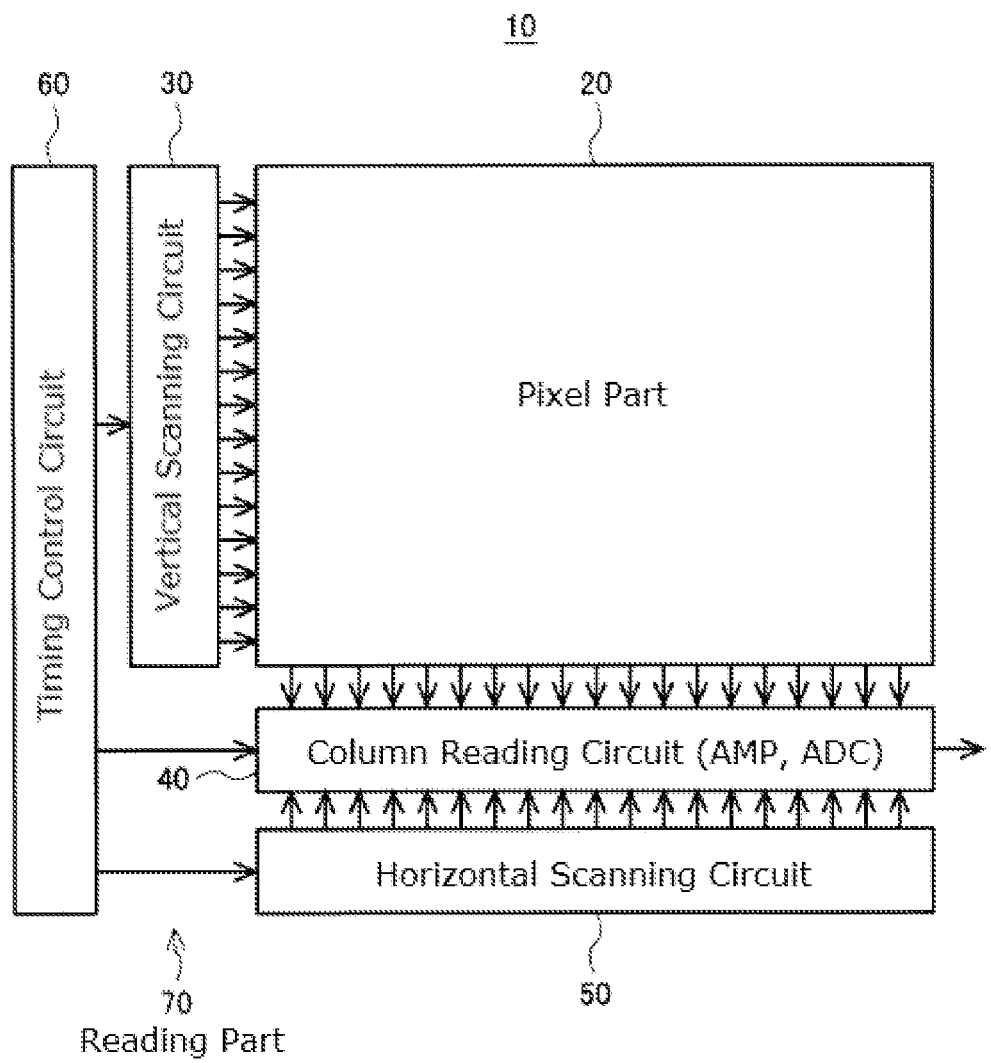
FIG. 4 is a block diagram showing an example configuration of a solid-state imaging device according to a first embodiment of the present invention.

FIG. 4 is a block diagram showing an example configuration of a solid-state imaging device relating to a first embodiment of the present invention. In this embodiment, a solid-state imaging device 10 is constituted by, for example, a CMOS image sensor.

As shown in FIG. 4, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, and a timing control circuit 60. Among these components, for example, the vertical scanning circuit 30, the column reading circuit 40, and the timing control circuit 60 constitute a reading part 70 for reading pixel signals.

In the first embodiment, the column reading circuit 40 of the solid-state imaging device 10 has an analog-to-digital (AD) converting function to analog-to-digital convert an analog pixel signal, which is read from a pixel of the pixel part 20, which is configured to perform photoelectric conversion, to a vertical signal line in the form of a voltage signal, as will be described in detail. In the first embodiment, the pixel signal read from the pixel includes a read-out reset signal VRST11 and a read-out signal VSIG11, which are read from the pixel sequentially. The column reading circuit 40 includes an AD converting part and a calculating part. The AD converting part is configured to analog-to-digital convert the read-out reset signal VRST11 and the read-out signal VSIG11 of the analog pixel signal Pixout read to the vertical signal line LSGN into an n-bit digital pixel signal ADC[n] (RST ADC[n] and SIG ADC[n]). The calculating part includes an n-bit asynchronous counter including a retention circuit with a control logic function, which is configured to obtain a difference between the n-bit read-out reset signal and the n-bit read-out signal produced by the AD conversion performed by the AD converting part.

In the first embodiment, the calculating part places the asynchronous counter in the non-operational state, captures, in synchronization with a capture signal, each bit of the n-bit read-out reset signal RSTADC[n] produced by the AD conversion performed by the AD converting part, and holds each bit in the retention circuit. The calculating part subsequently places the asynchronous counter in the operational state, captures, in synchronization with a capture signal, each bit of the n-bit read-out signal SIGADC[n] produced by the AD conversion performed by the AD converting part, adds the captured read-out signal SIGADC[n] to the read-out reset signal RSTADC[n] held in the retention circuit, performs counting and performs an operation (SIG−RST) between the negative version of the read-out reset signal and the positive version of the read-out signal.

As for this operation, if the outputs from the AD converting part are added together as they are, the operation (RST+SIG) is performed. To overcome this issue, in the first embodiment, the column reading circuit includes a signal inverting part for inverting the read-out reset signal RSTADC to obtain −RSTADC so that the operation (SIG−RST) can be performed. The signal inverting part for inverting the n-bit read-out reset signal RSTADC produced by the AD conversion is arranged after the output part of the AD converting part and before the input part of the retention circuit.

In the first embodiment, the reading part 70 is configured to perform a first read-out operation and a second read-out operation in a signal read-out scan period. The first read-out operation is performed in a first read-out period following a reset period and intended to read the read-out reset signal VRST11 (reset voltage Vrst). The second read-out operation is performed in a second read-out period following a transfer period following the first read-out period following the reset period and intended to read the read-out signal VSIG11 (signal voltage Vsig) corresponding to the charges stored in the photoelectric conversion element.

In a normal pixel read-out operation, the reading part 70 drives the pixels in such a manner that a shutter scan is followed by a read-out scan. The first read-out operation and the second read-out operation are performed in the period of the read-out scan.

The following first outlines the configurations and functions of the parts of the solid-state imaging device 10 and then describes the circuit configuration of the column reading system and relating read-out operations and the like.

<Configurations of Pixel Part 20 and Pixel PXL>

In the pixel part 20, a plurality of pixels each including a photodiode (photoelectric converting element) and an inpixel amplifier are arranged in a two-dimensional matrix comprised of X rows and Y columns.

Figure 5:
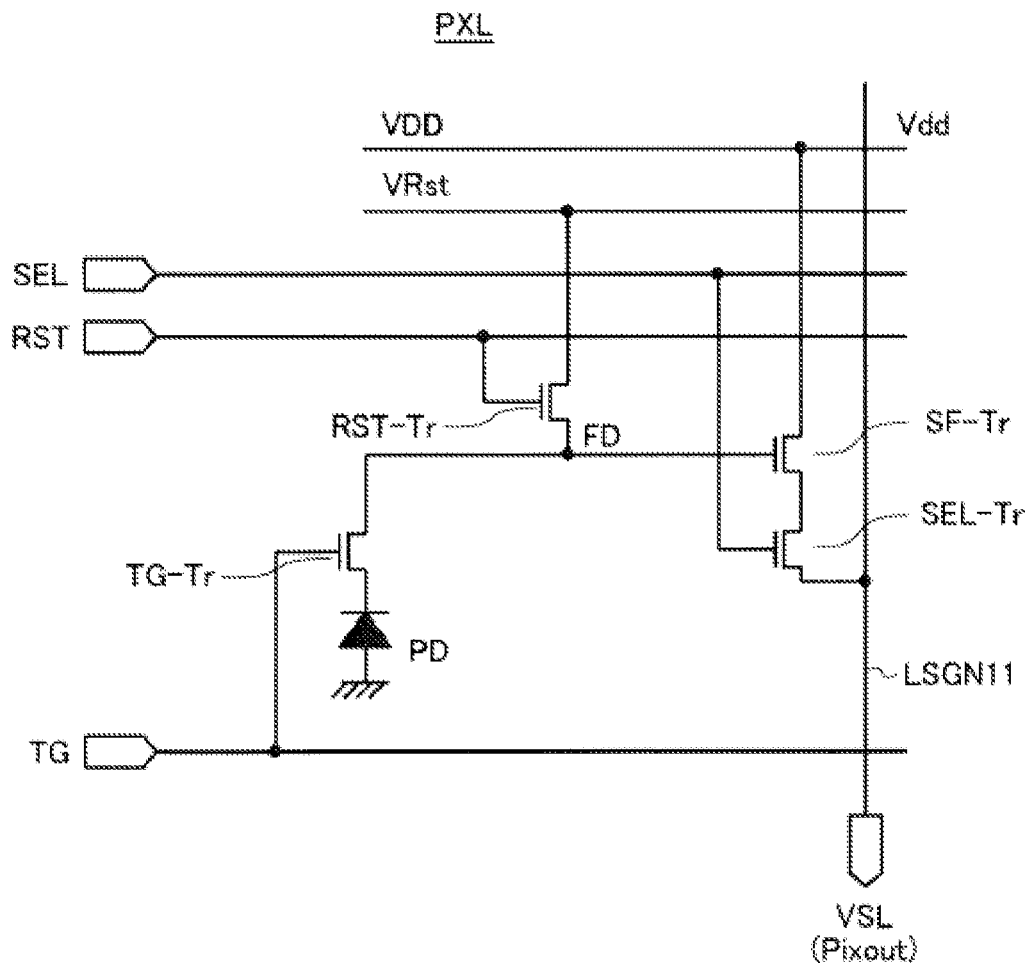
FIG. 5 is a circuit diagram showing an example of the pixels according to the first embodiment.

FIG. 5 is a circuit diagram showing an example of the pixels according to the first embodiment.

The pixel PXL includes, for example, a photodiode (PD) serving as a photoelectric converting element. For the photodiode PD, the pixel PXL includes one transfer transistor TG-Tr serving as a transfer element, one reset transistor RST-Tr serving as a reset element, one source follower transistor SF-Tr serving as a source follower element, and one selection transistor SEL-Tr serving as a selection element.

The photodiode PD generates signal charges (electrons) in an amount in accordance with the quantity of the incident light and stores the generated signal charges. A description will be hereinafter given of a case where the signal charges are electrons and each transistor is an n-type transistor. However, it is also possible that the signal charges are holes or each transistor is a p-type transistor. Further, the first embodiment is also applicable to the case where a plurality of photodiodes share the transistors or the case where the pixels include no selection transistor or have the 3-transistor (3Tr) configuration.

The transfer transistor TG-Tr is connected between the photodiode PD and the floating diffusion FD and controlled by a control signal TG applied to the gate thereof through a control line. The transfer transistor TG-Tr remains selected and in the conduction state during the period in which the control signal is at the high (H) level, to transfer to the floating diffusion FD the charges (electrons) produced by photoelectric conversion and then stored in the photodiode PD.

The reset transistor RST-Tr is connected between the power supply line VRst and the floating diffusion FD and controlled by a control signal RST applied to the gate thereof through a control line. The reset transistor RST-Tr may be connected between the power supply line Vdd of the power supply voltage VDD and the floating diffusion FD and controlled by a control signal RST applied to the gate thereof through a control line. The reset transistor RST-Tr remains selected and in the conduction state during the period in which the control signal RST is at the H level, to reset the floating diffusion FD to the potential of the power supply line VRst (or the power supply line Vdd of the power supply voltage VDD).

The source follower transistor SF Tr and the selection transistor SEL-Tr are connected in series between the power supply line Vdd of the power supply voltage VDD and the vertical signal line LSGN11. The gate of the source follower transistor SF-Tr is connected to the floating diffusion FD, and the selection transistor SEL-Tr is controlled by a control signal SEL applied to the gate thereof through a control line. The selection transistor SEL Tr remains selected and in the conduction state during the period in which the control signal SEL is at the H level. In this way, the source follower transistor SF-Tr outputs, to the vertical signal line LSGN11, a read-out voltage (signal) VSL (PIXOUT) of a column output, which is obtained by converting the charges in the floating diffusion FD10 into a voltage signal. These controls are performed simultaneously and in parallel for pixels in each row since, for example, the gates of the transfer transistors TG-Tr, the reset transistors RST-Tr, and the selection transistors SEL-Tr in each row are connected to each other.

Since the pixel part 20 includes the pixels PXL arranged in X rows and Y columns, there are X control lines for each of the control signals SEL, RST and TG, and Y vertical signal lines LSGN11. In FIG. 4, the control lines of the control signals SEL, RST, TG are represented as one row-scanning control line.

The vertical scanning circuit 30 drives the pixels in shutter and read-out rows through the row-scanning control lines under the control of the timing control circuit 60. Further, the vertical scanning circuit 30 outputs, according to address signals, row selection signals for row addresses of the read-out rows from which signals are to be read out and the shutter rows in which the charges accumulated in the photodiodes PD are reset.

As described above, in a normal pixel read-out operation, a shutter scan and then a read-out scan are performed in response to the vertical scanning circuit 30 of the reading part 70 driving the pixels.

Figure 6:
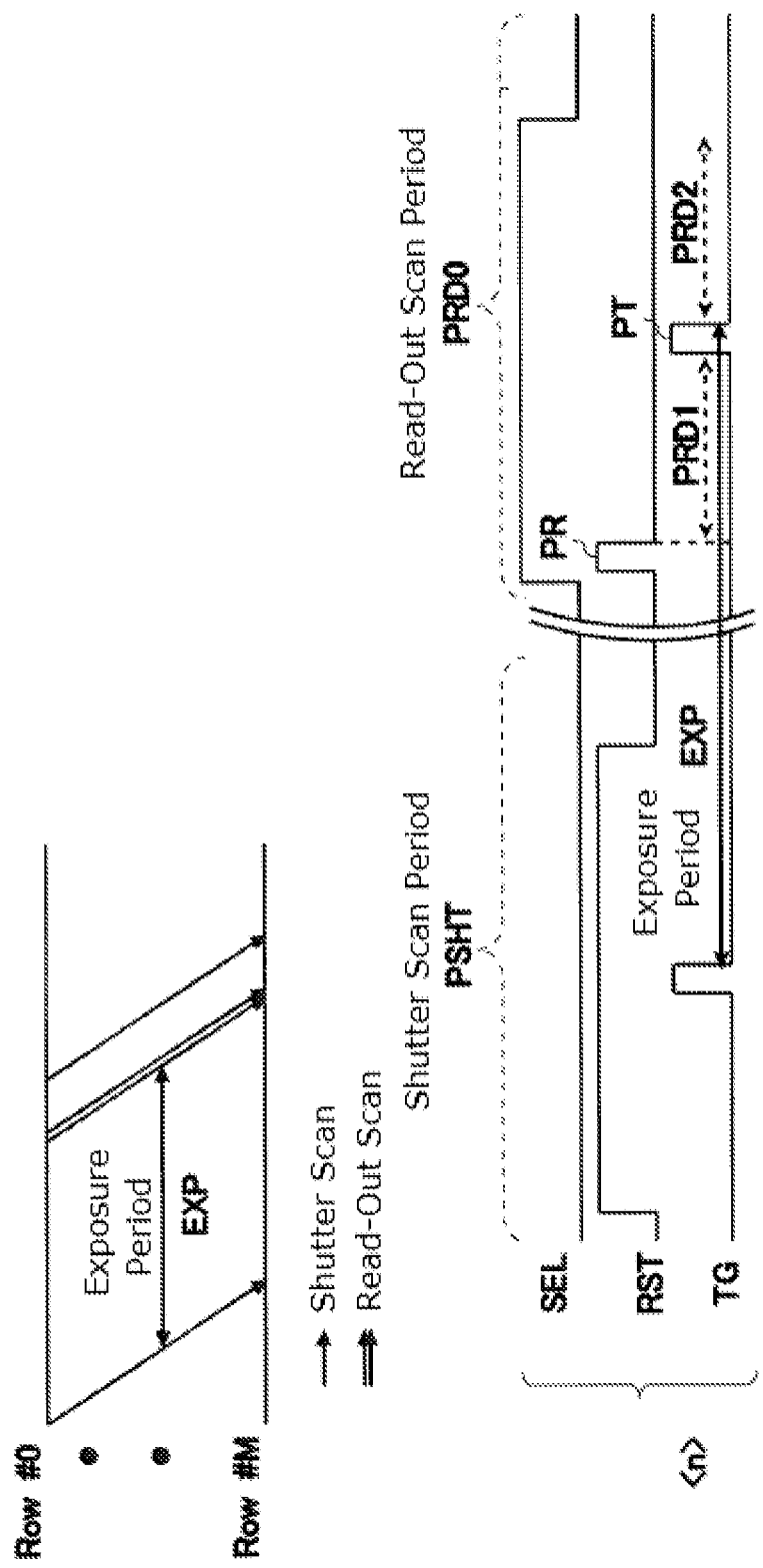
FIG. 6 shows the timings of a shutter scan and a read-out scan performed to ordinarily capture signals from the pixels in the first embodiment of the present invention.

FIG. 6 shows the timings of a shutter scan and a reading scan in a normal pixel read-out operation according to the first embodiment of the present invention.

The control signal SEL, which controls the ON (conduction) state and the OFF (non-conduction) state of the selection transistor SEL-Tr, remains at the low level (L) during a shutter scan period PSHT to keep the selection transistor SEL-Tr in the non-conduction state. The control signal SEL remains at the H level during a read-out scan period PRDO to keep the selection transistor SEL Tr in the conduction state. In the shutter scan period PSHT, the control signal TG remains at the high level (H) for a predetermined period within the period in which the control signal RST is at the high level (H), such that the photodiode PD and the floating diffusion FD are reset through the reset transistor RST-Tr and the transfer transistor TG-Tr.

In the read-out scan period PRDO, the control signal RST is set at the high level (H), to reset the floating diffusion FD through the reset transistor RST-Tr. This reset period PR is followed by a first read-out period PRD1, in which a pixel read-out signal VRST11 (reset voltage Vrst) representing a reset state is read out. After the read-out period PRD1, the control signal TG remains at the high level (H) for a predetermined period, to transfer the charges stored in the photodiode PD to the floating diffusion FD through the transfer transistor TG-Tr. This transfer period PT is followed by a second read-out period PRD2, in which a pixel read-out signal VSIG11 (signal voltage Vsig) corresponding to the stored electrons (charges) is read out.

In the normal pixel read-out operation according to the first embodiment, as shown in FIG. 6, an integration period (exposure period) EXP spans from the time in the shutter scan period PSHT at which the control signal TG is switched to the L level after the photodiode PD and the floating diffusion FD are reset to the time in the reading scan period PRDO at which the control signal TG is switched to the L level to terminate the transfer period PT.

The column reading circuit 40 includes a plurality of column signal processing circuits (not shown) arranged so as to correspond to the column outputs from the pixel part 20, and the column reading circuit 40 may be configured such that the plurality of column signal processing circuits are capable of processing the columns in parallel.

The column reading circuit 40 may include a correlated double sampling (CDS) circuit, an analog-to-digital converter (ADC), an amplifier (AMP) and the like. The configuration and capability of the column reading circuit 40 will be described in detail below.

The horizontal scanning circuit 50 scans the signals processed in the plurality of column signal processing circuits, for example, ADCs of the column reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the column reading circuit 40, the horizontal scanning circuit 50, and the like.

The column reading circuit 40 relating to the first embodiment includes the AD converting part and the calculating part. The AD converting part is configured to analog-to-digital convert the read-out reset signal VRST11 and the read-out signal VSIG11 of the analog pixel signal Pixout read to the vertical signal line LSGN11 into an n-bit digital pixel signal ADC[n] (RST ADC[n] and SIG ADC[n]). The calculating part includes an n-bit asynchronous counter including a retention circuit with a control logic function, which is configured to obtain a difference between the n-bit read-out reset signal and the n-bit read-out signal produced by the AD conversion performed by the AD converting part.

(Specific Example Configuration of Column Reading Circuit 40)

Figure 7:
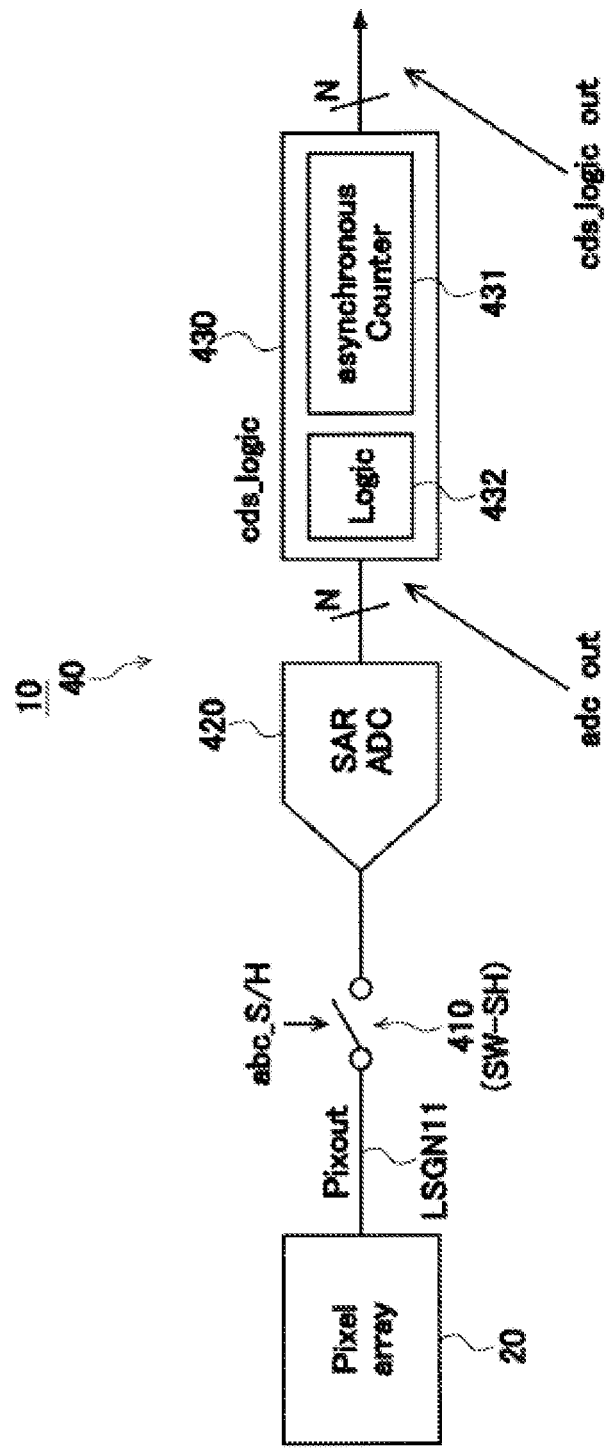
FIG. 7 shows a basic example configuration of a column reading system relating to the first embodiment of the present invention.

The following describes the specific example configuration of the column reading circuit 40 of the first embodiment, with a focus on the configuration of the calculating part. FIG. 7 shows a basic example configuration of the column reading system relating to the first embodiment of the present invention.

The column reading circuit 40 of FIG. 7 includes a sample-and-hold switch 410 (SW-SH) for AD conversion, an AD converting part 420, and a calculating part 430.

Figure 8:
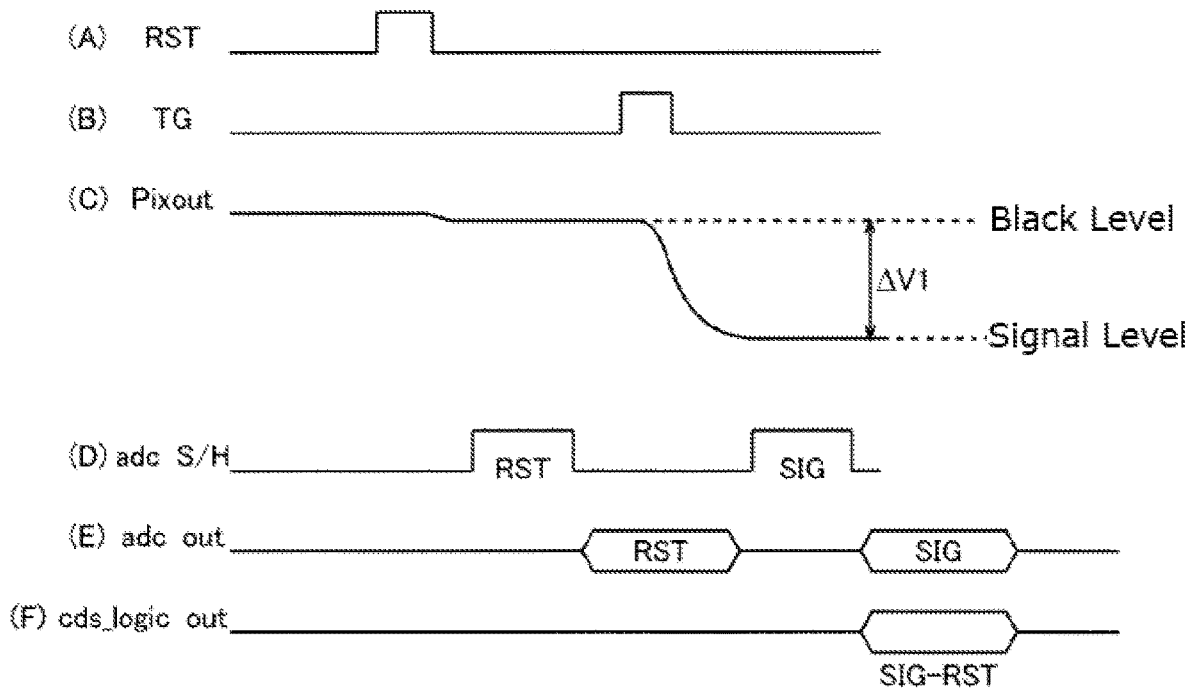
FIG. 8 is a timing chart to briefly illustrate how the column reading system of FIG. 7 operates.

FIG. 8 is a timing chart including parts (A) to (F) to briefly illustrate how the column reading system of FIG. 7 operates. In FIG. 8, the part (A) shows the control signal RST for the reset transistor RST-Tr, the part (B) shows the control signal TG for the transfer transistor TG-Tr, the part (C) shows the read-out level of the pixel signal Pixout, the part (D) shows a control signal adc_S/H for the sample-and-hold switch 410 for AD conversion, the part (E) shows the output signal (output data) adc_out of the AD converting part 420, and the part (F) shows the output signal (output data) cds_logic_out of the calculating part 430.

As shown in the parts (A) to (D) in FIG. 8, the switch 410 controls the read-out reset signal VRST11 and the read-out signal VSIG11 of the pixel signal Pixout, which is read from the pixel PXL of the pixel part 20 to the vertical signal line LSGN11, to be sequentially captured by the AD converting part 420 in response to the control signal adc_S/H.

As shown in the part (E) of FIG. 8, the AD converting part 420 analog-to-digital converts the read-out reset signal VRST11 and the read-out signal VSIG11 of the analog pixel signal Pixout, which is read from the pixel PXL to the vertical signal line LSGN11 and captured via the switch 410, into an n-bit digital pixel signal ADC[n] (RST ADC[n] and SIG ADC[n]), and outputs the n-bit digital pixel signal ADC[n] (RST.ADC[n] and SIG.ADC[n]) produced by the AD conversion to the calculating part 430.

The calculating part 430 includes an n-bit asynchronous counter 431 including a retention circuit with a control logic function for obtaining the difference between the n-bit read-out reset signal and the n-bit read-out signal produced by the AD conversion performed by the AD converting part 420, in other words, the difference (SIG ADC[n]−RST ADC[n]) between the digital read-out reset signal RST.ADC [n] and the digital read-out signal SIG.ADC[n] of the n-bit digital pixel signal ADC[n] produced by the AD conversion. The calculating part 430 is configured to produce the differential data (SIG−RST) through the combination and cooperation of the asynchronous counter 431 and an arithmetic circuit 432.

More specifically, based on the cooperation of the asynchronous counter 431 and the arithmetic circuit 432, the calculating part 430 first places the asynchronous counter 431 in the non-operational state, captures, in synchronization with a capture signal clk, each bit of the n-bit read-out reset signal RSTADC[n] produced by the AD conversion performed by the AD converting part 420, and holds each bit in the retention circuit. Subsequently, the calculating part 430 places the asynchronous counter 431 in the operational state, captures, in synchronization with a capture signal clk, each bit of the n-bit read-out signal SIGADC[n] produced by the AD conversion performed by the AD converting part 420, adds the captured read-out signal SIGADC[n] to the read-out reset signal RSTADC[n] held in the retention circuit, performs counting, and performs an operation (SIG−RST) between the negative version of the read-out reset signal and the positive version of the read-out signal, as shown in the part (F) of FIG. 8.

Figure 9:
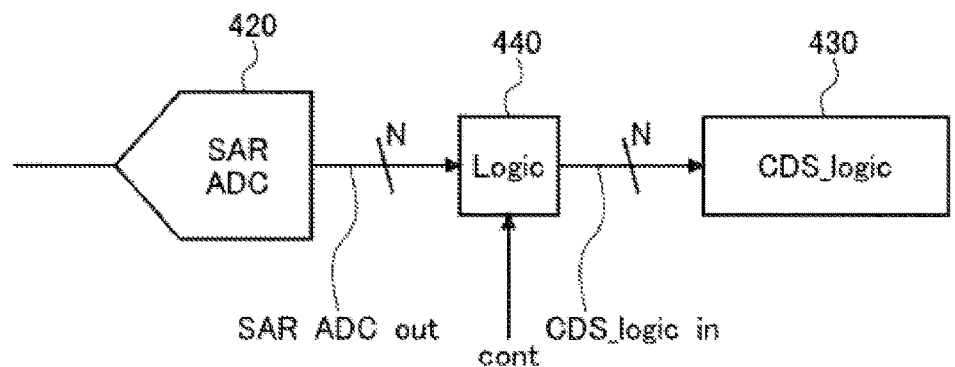
FIG. 9 shows an example configuration of a column reading circuit relating to the first embodiment of the present invention, where a signal inverting part is arranged on the output side of an AD converting part in order to invert a reset signal.
Figure 10:
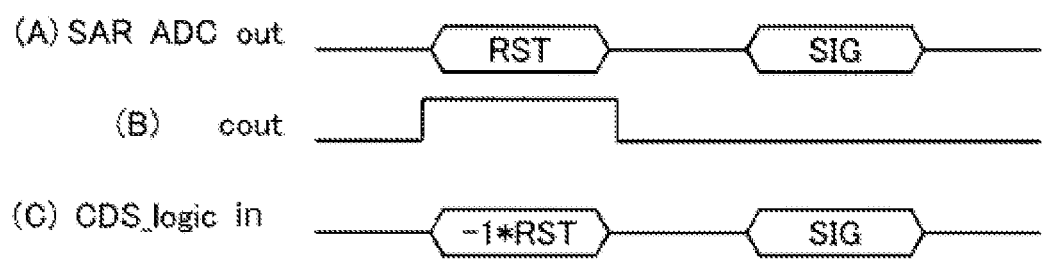
FIG. 10 is a timing chart to briefly illustrate how the column reading circuit of FIG. 9 operates.

FIG. 9 shows an example configuration of the column reading circuit relating to the first embodiment of the present invention, where a signal inverting part is arranged on the output side of the AD converting part in order to invert the reset signal. FIG. 10 is a timing chart including parts (A) to (C) to briefly illustrate how the column reading circuit of FIG. 9 operates. In FIG. 10, the part (A) shows the output signal (output data) ADCout from the AD converting part 420, the part (B) shows the control signal cont for a signal inverting part 440, and the part (C) shows the input signal (input data) CDS_logic_in into the calculating part 430.

As for the above-described operation performed by the calculating part 430, if the outputs from the AD converting part 420 are added together as they are, the operation (RST+SIG) is performed. To overcome this issue, in the first embodiment, the column reading circuit 400 includes a signal inverting part 440 for inverting the read-out reset signal RSTADC to obtain −RST ADC in order to calculate the operation (SIG−RST). The signal inverting part 440 is arranged after the output part of the AD converting part 420 and before the input part of the retention circuit for inverting the n-bit read-out reset signal RSTADC produced by the AD conversion.

In the example in FIG. 9, the signal inverting part 440 is arranged on the output side of the AD converting part 420. According to this example, the signal inverting part 440 inverts the n-bit read-out reset signal RST.ADC produced by the AD conversion while the control signal cont remains at the active or high level. The signal inverting part 440 multiplies, by (−1), the n-bit read-out reset signal RSTADC output from the AD converting part 420 (−1*RST ADC).

(Specific Configuration and Functions of Calculating Part 430)

Figure 11:
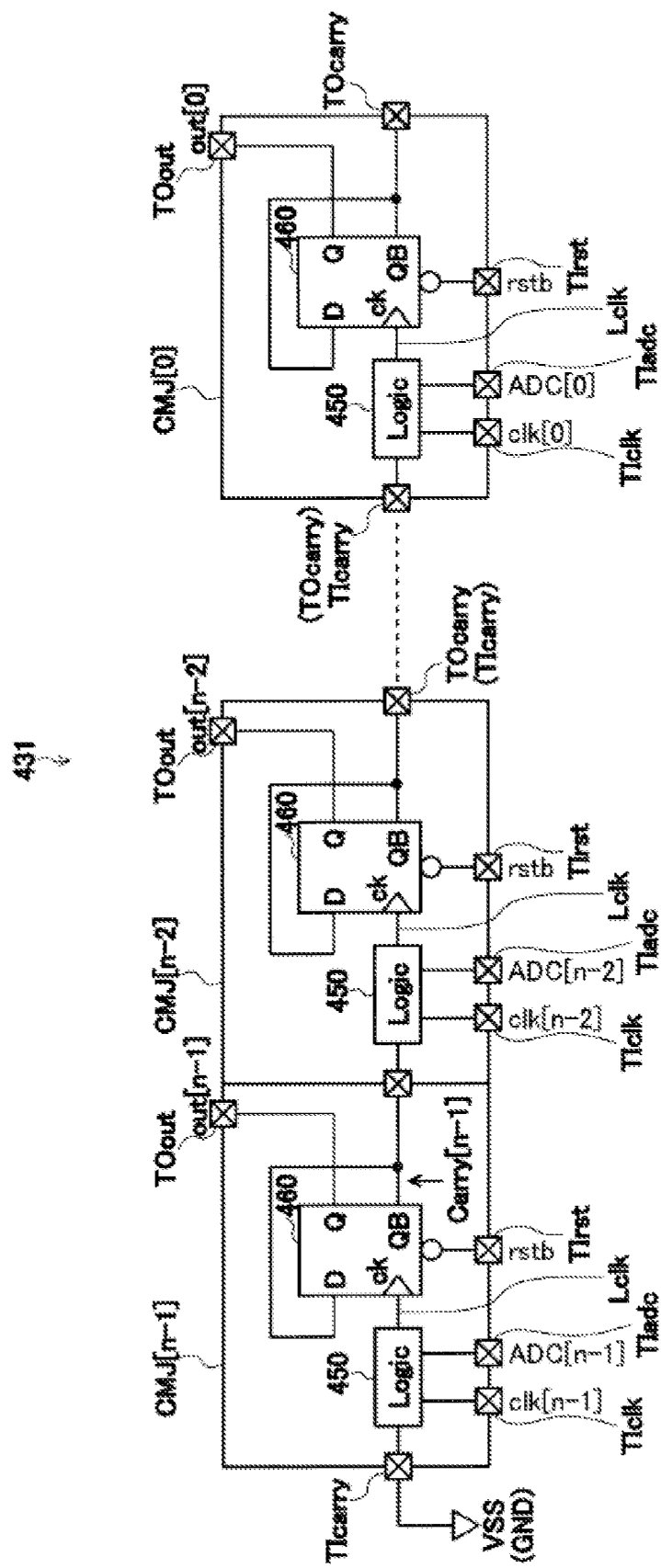
FIG. 11 is a block diagram showing an example overall configuration of an n-bit asynchronous counter with a retention circuit with control logic function in a calculating part of the first embodiment of the invention.
Figure 12:
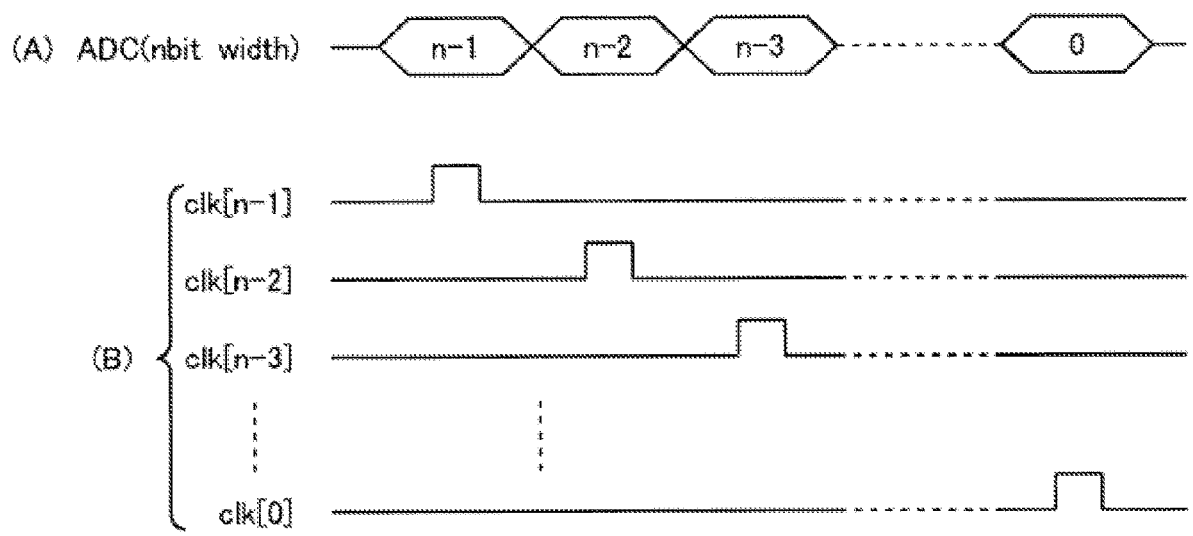
FIG. 12 is a timing chart for illustrating how the respective asynchronous counter modules of FIG. 11 capture a digital pixel signal ADC.

The following now describes the more specific configuration and function of the calculating part 430 relating to the first embodiment. FIG. 11 is a block diagram showing an example overall configuration of the n-bit asynchronous counter 431 including the retention circuit with control logic function in the calculating part of the first embodiment of the invention. FIG. 12 is a timing chart including parts (A) and (B) for illustrating how the respective asynchronous counter modules of FIG. 11 read the digital pixel signal ADC. In FIG. 12, the part (A) shows the n-bit digital pixel signal ADC[n−1] to ADC[0] fed to the asynchronous counter modules CMJ[n−1] to CMJ[0], and the part (B) shows capture signals clk[n−1] to clk[0] used to read the digital pixel signal ADC[n−1] to ADC[0] fed to the asynchronous counter modules CMJ[n−1] to CMJ[0].

As shown in FIG. 11, the calculating part 430 includes n asynchronous counter modules CMJ[n−1] to CMJ[0] arranged in a one-to-one correspondence with the bits of the digital pixel signal ADC [n−1] to ADC [0] including the n-bit read-out reset signal RSTADC and the read-out signal SIGADC. In the calculating part 430, the asynchronous counter modules CMJ[n−1] to CMJ[0] are connected in cascade through a carry input/output line. In this manner, the asynchronous counter 431 is formed.

The asynchronous counter modules CMI[n−1]-CMJ[0] each include: a digital pixel signal input terminal TIadc for receiving a corresponding one of the bits of the read-out reset signal RST ADC and a corresponding one of the bits of the read-out signal SIGADC input thereto with a time lag therebetween; a capture signal input terminal TIclk for receiving a capture signal clk used for capturing the corresponding one of the bits of the read-out reset signal RSTADC and the corresponding one of the bits of the read-out signal SIG ADC; a carry signal input terminal TIcarry for receiving a carry signal Carry from a lower-order module; a signal output terminal TOout for outputting an output signal out from the present module; a carry output terminal TOcarry for outputting a carry signal Carry for a higher-order module; and a reset terminal TIrst for receiving a counter reset signal rst.

The asynchronous counter modules CMI[n−1]-CMJ[0] each further include a logic circuit 450 and a D flip flop (DFF) 460 also serving as a retention circuit for performing an operation in response to the clock signal Lclk from the logic circuit 450.

The logic circuit 450 generates a clock signal Lclk[n−1] and outputs the generated clock signal Lclk[n−1] to the clock terminal CK of the D flip-flop (DFF) 460. The clock signal Lclk[n−1] is generated based on the digital pixel signal ADC (RSTADC, SIG ADC) read in response to the capture signal clk, and a logical operation associated with a carry signal Carry[n−1] from the lower-order one of the asynchronous counter modules.

As for the D flip-flop (DFF) 460, the data output Q is connected to the signal output terminal TOout, the data inverting output terminal QB is connected to its own data input D and to the carry output terminal TOcarry connected to the carry signal input terminal TI carry of the higher-order one of the asynchronous counter modules, and the clock terminal CK is connected to the output terminal of the clock signal Lclk of the logic circuit 450.

(Example Configuration of Logic Circuit 450)

Figure 13:
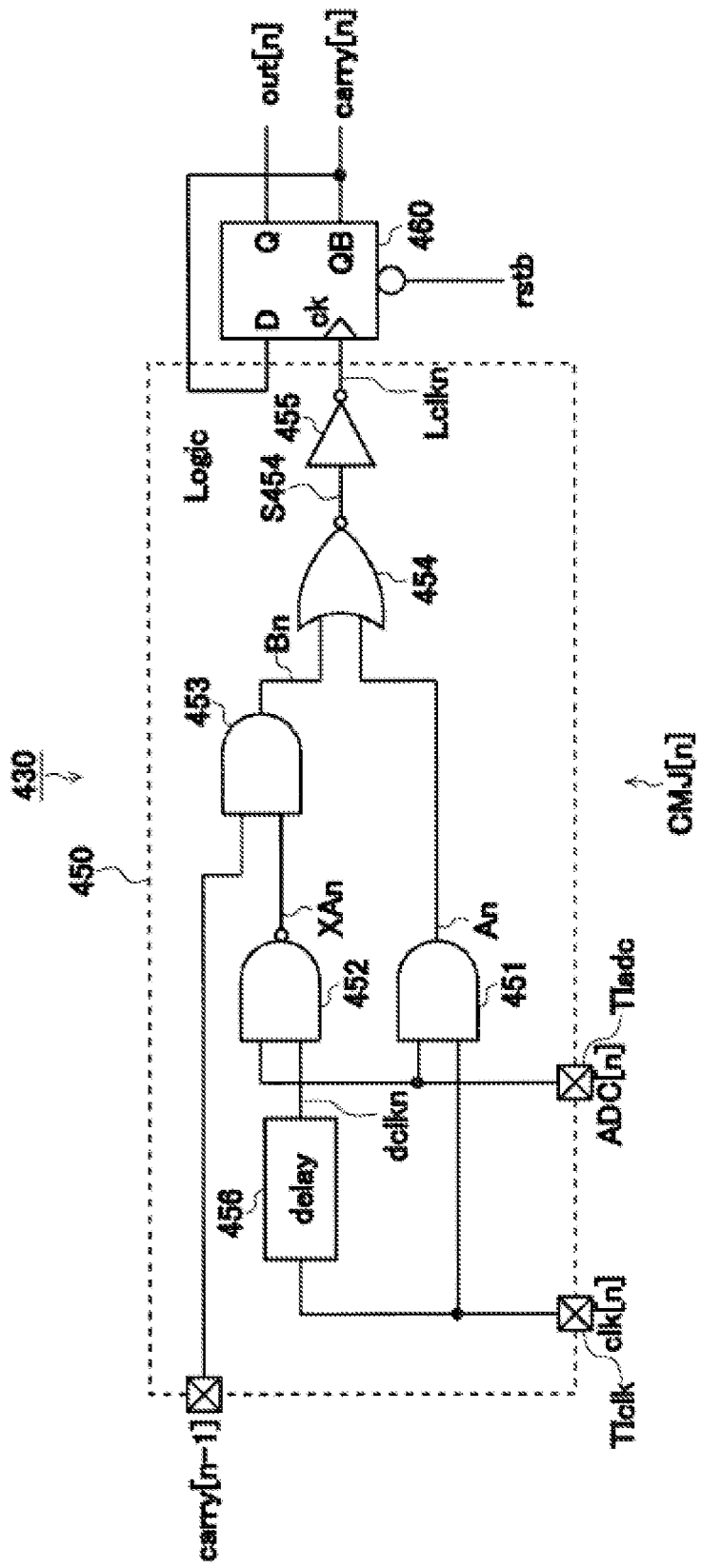
FIG. 13 is a circuit diagram showing a specific example configuration of a logic circuit in the asynchronous counter module forming each stage of the counter relating to the first embodiment of the present invention.

The following now specifically describes the example configuration of the logic circuit 450 in the calculating part 430. FIG. 13 is a circuit diagram showing a specific example configuration of the logic circuit in the asynchronous counter module forming each stage of the counter relating to the first embodiment of the present invention.

The logic circuit 450 shown in FIG. 13 includes a first logic gate 451, a second logic gate 452, a third logic gate 453, a fourth logic gate 454, a fifth logic gate 455, and a delay circuit 456.

The first logic gate 451 performs a logical operation (a logical AND: AND) between the read-out reset signal RSTADC or the read-out signal SIG ADC fed to a first input terminal through the digital pixel signal input terminal TIadc and the capture signal clk fed to a second input terminal through the capture signal input terminal TIclk, and produces a first signal An corresponding to the read-out reset signal RSTADC or the rad-out signal SIG ADC.

The second logic gate 452 performs a logical operation (a logical NAND: NAND) between the read-out reset signal RSTADC or the read-out signal SIG ADC fed to a first input terminal through the digital pixel signal input terminal TIadc and a delayed capture signal dclkn fed to a second input terminal via the capture signal input terminal TIclk and delayed by the delay circuit 456 by a predetermined period of time, and produces a second signal XAn corresponding to the inverted version of the read-out reset signal RSTADC or the read-out signal SIG ADC.

The third logic gate 453 performs a logical operation (logical AND:AND) between the second signal Xan from the second logic gate 452 and the carry signal Carry[n−1] from the lower-order-bit module input through the carry signal input terminal TIcarry, and produces a third signal Bn.

The fourth logic gate 454 performs a logical operation (logical NOR: NOR) between the first signal An and the third signal Bn to produce a fourth signal 5454.

The fifth logic gate 454 inverts the fourth signal 5454 from the fourth logic gate 454 to produce the clock signal Lclkn.

In the calculating part 430 having the above configuration, each asynchronous counter module CMJ follows any one of the following four capture patterns PTN: PTN1; PTN2; PTN3; and PTN4 when the capture signal for the digital pixel signal ADC is clk[n]=1 (the capture signal clk[n] is active), where the carry signal from the lower-order asynchronous counter module CMJ[n−1] is represented as Carry[n−1], the digital pixel signal produced by the AD converting part 420 is represented as ADC[n], and the digital values HIGH and LOW are respectively represented by "1" and "0."

PTN 1: Carry[n−1]=0/ADC[n]=0
PTN 2: Carry[n−1]=0/ADC[n]=1
PTN 3: Carry[n−1]=1/ADC[n]=0
PTN 4: Carry[n−1]=1/ADC[n]=1

In the asynchronous counter module CMJ[n], the output signal out[n] and the carry output signal Carry[n] are inverted when the captured digital pixel signal produced by the AD converting part 420 is ADC [n]=1. In other words, from among the above-listed four patterns PTN1, PTN2, PTN3 and PTN4, the output signal out[n] and the carry output signal Carry[n] are inverted in the case of the patterns PTN2 and PTN4 where the captured digital pixel signal is ADC[n]=1.

When the asynchronous counter module CMJ[n] reads the digital pixel signal ADC[n]=0 from the AD converting part 420, the values remain unchanged.

Figure 14:
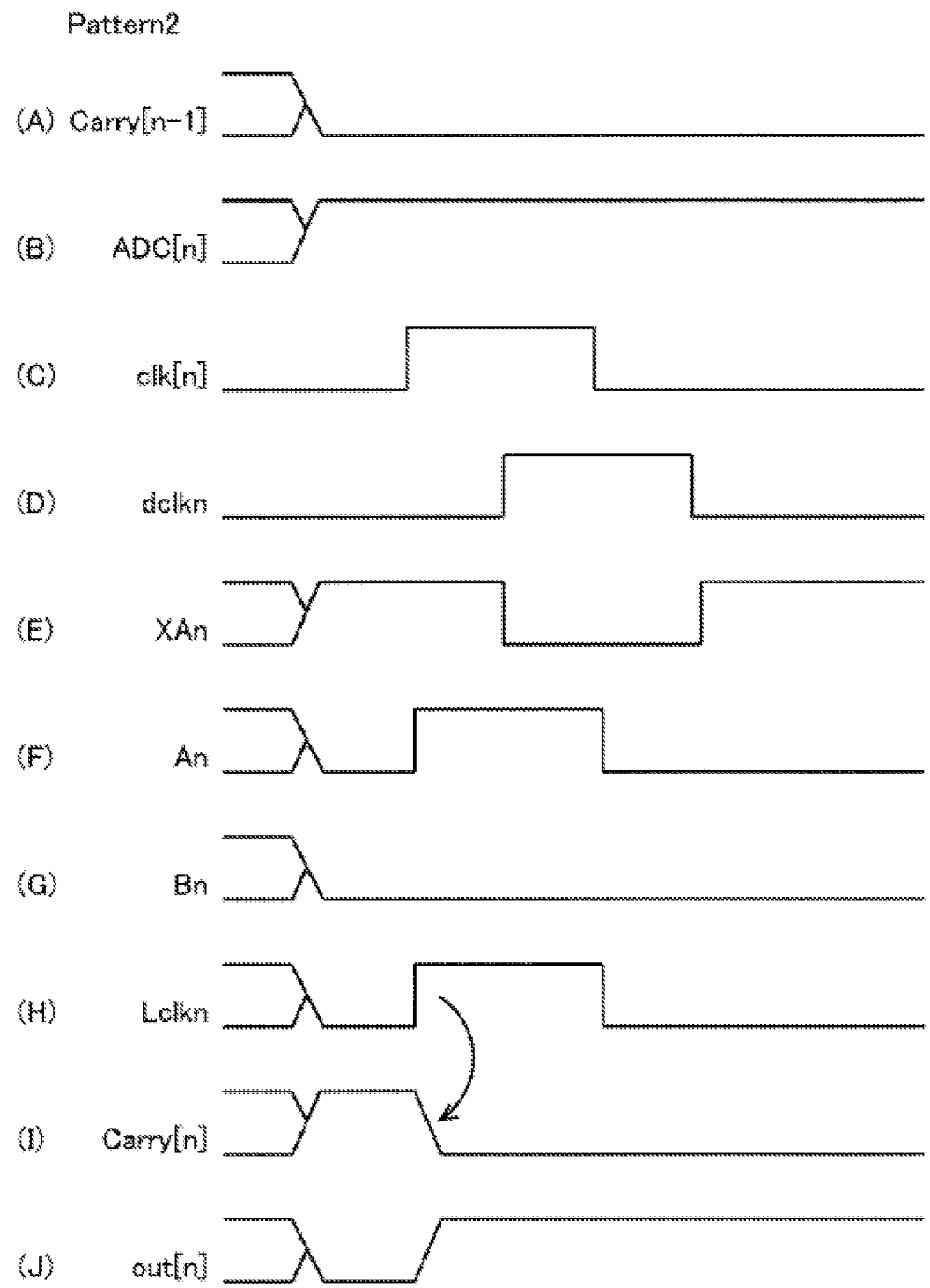
FIG. 14 is a timing chart showing, as an example, how the asynchronous counter modules of the first embodiment of the present invention operate in a capturing pattern PTN2 where a signal output signal and a carry output signal are inverted.
Figure 15:
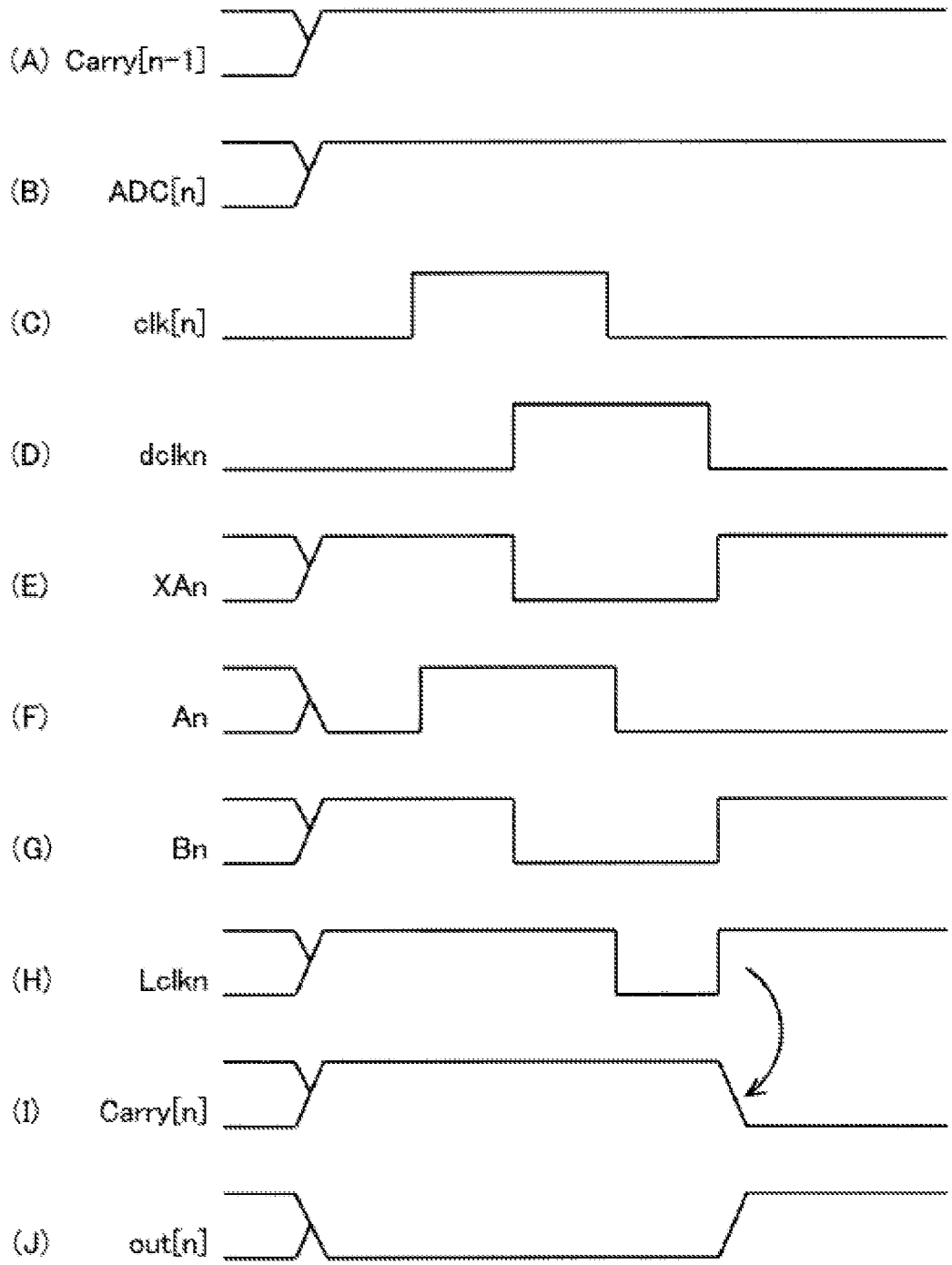
FIG. 15 is a timing chart showing, as an example, how the asynchronous counter modules of the first embodiment of the present invention operate in a capturing pattern PTN4 where an output signal and a carry output signal are inverted.
Figure 16:
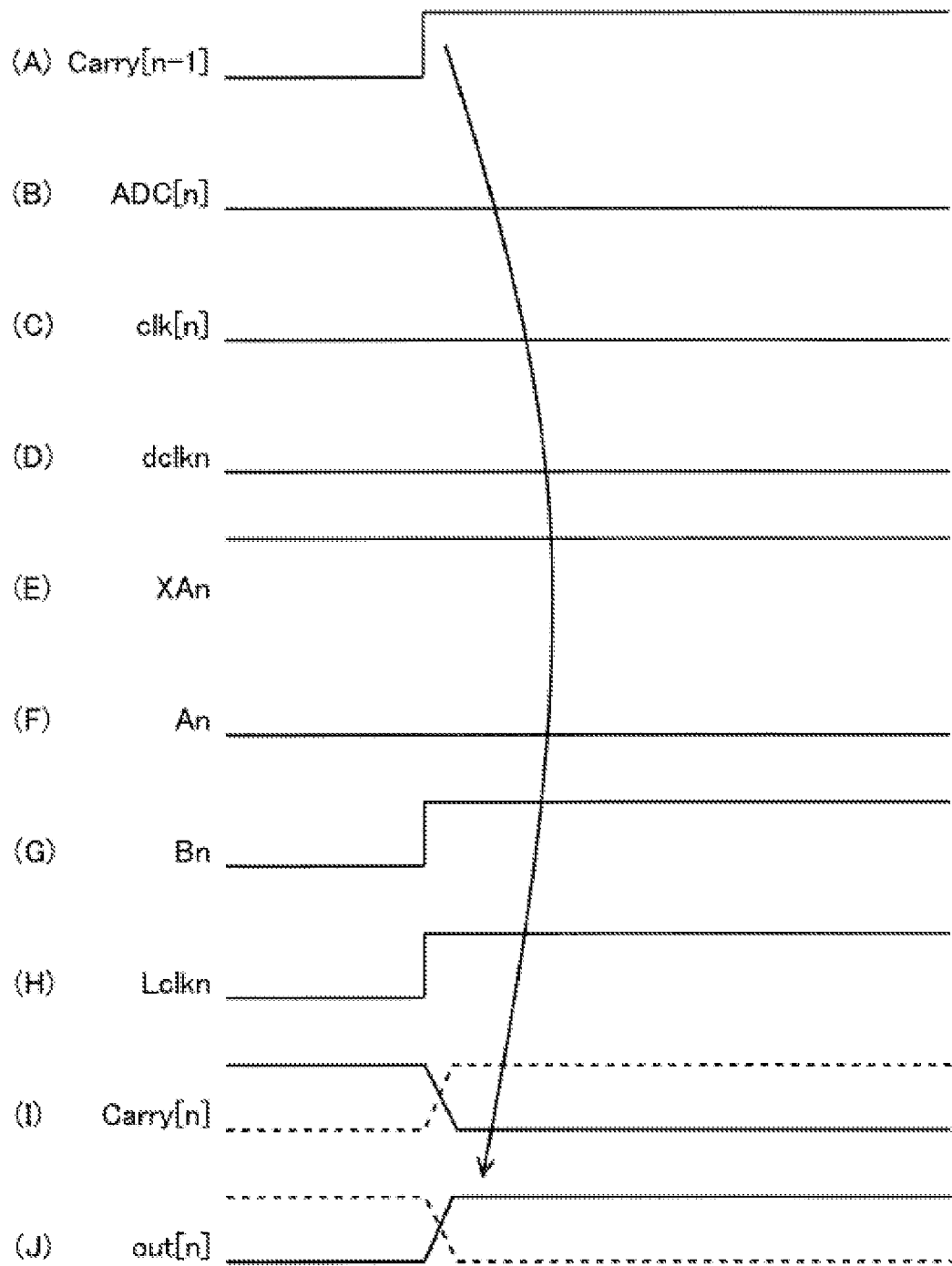
FIG. 16 is a timing chart showing, as an example, how the asynchronous counter modules of the first embodiment of the present invention operate when count-up is performed.

FIG. 14 is a timing chart including parts (A) to (J) showing, as an example, how the asynchronous counter module CMJ[n] of the first embodiment of the present invention operates in the case of the capturing pattern PTN2 where the output signal out[n] and the carry output signal Carry[n] are inverted. FIG. 15 is a timing chart including parts (A) to (J) showing, as an example, how the asynchronous counter module CMJ[n] of the first embodiment of the present invention operates in the case of the capturing pattern PTN4 where the output signal out[n] and the carry output signal Carry[n] are inverted. FIG. 16 is a timing chart including parts (A) to (J) showing, as an example, how the asynchronous counter module CMJ[n] of the first embodiment of the present invention operates when count-up is performed.

In FIGS. 14 to 16, the part (A) shows the carry signal Carry [n−1] from the lower-order asynchronous counter module CMJ[n−1], the part (B) shows the digital pixel signal ADC[n] from the AD converting part 420, the part (C)

shows the capture signal clk[n] fed to the asynchronous counter module CMJ[n], the part (D) shows the delayed capture signal dxlkn, the part (E) shows the second signal XAn, the part (F) shows the first signal An, the part (G) shows the third signal Bn, the part (H) shows the clock signal Lckl, the part (H) shows the carry signal Carry[n], and the part (I) shows the output signal out[n].

As described above with reference to FIGS. 14 and 15, the output signal out[n] and the carry output signal Carry[n] are inverted in the case of the patterns PTN2 and PTN4 where the digital pixel signal ADC[n]=1 is captured irrespective of whether the carry signal Carry[n−1] from the lower-order asynchronous counter module CMJ[n−1] indicates "0" or "1."

As shown in FIG. 16, when the asynchronous counter module CMJ[n] captures the digital pixel signal ADC [n]=0 from the AD converting part 420, its values remain unchanged. As shown in FIG. 16, the value of the carry signal Carry[n−1] from the lower-order asynchronous counter module CMJ[n−1] may be inverted from "0" to "1" when the (n−1)-th bit is captured. If such is the case, the toggle transfers to the clock signal Lclk of the asynchronous counter module for the n-th bit, so that the output signal (data) out[n] corresponding to the n-th bit is also inverted and count-up is performed.

The above has described in detail the configurations and functions of the parts of the solid-state imaging device 10, such as the calculating part 430 of the column reading circuit 40. The following now describes, as an example, how to read the pixel signal in the solid-state imaging device 10 relating to the first embodiment with reference to FIGS. 17 and 18 including the parts (A) to (I). Note that the following describes an example case where the signal has two bits, and the read-out reset signal RST ADC[1:0]=01 and the read-out signal SIGADC [1:0]=01. The expected value in this example is 2b'01+2b'01=2b'10.

Figure 17:
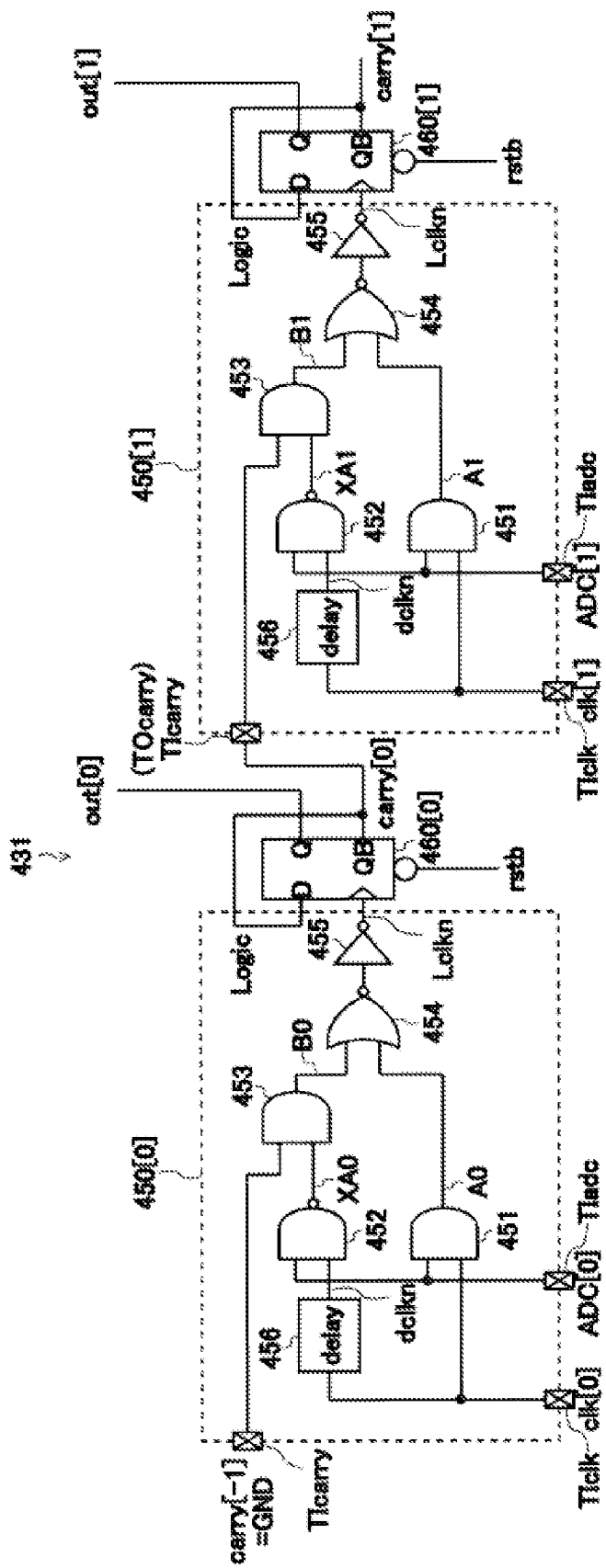
FIG. 17 is a block diagram showing an example configuration of a 2-bit asynchronous counter in a calculating part of the first embodiment of the invention.

FIG. 17 is a block diagram showing an example configuration of a 2-bit asynchronous counter in the calculating part relating to the first embodiment of the invention. The asynchronous counter in FIG. 17 is formed by two asynchronous counter modules CMJ shown in FIG. 13 connected in cascade. In this case, the carry signal input terminal TIcarry[0] of the lower-order asynchronous counter module CMJ[0] is connected to the reference potential (in this example, the ground (GND)).

Figure 18:
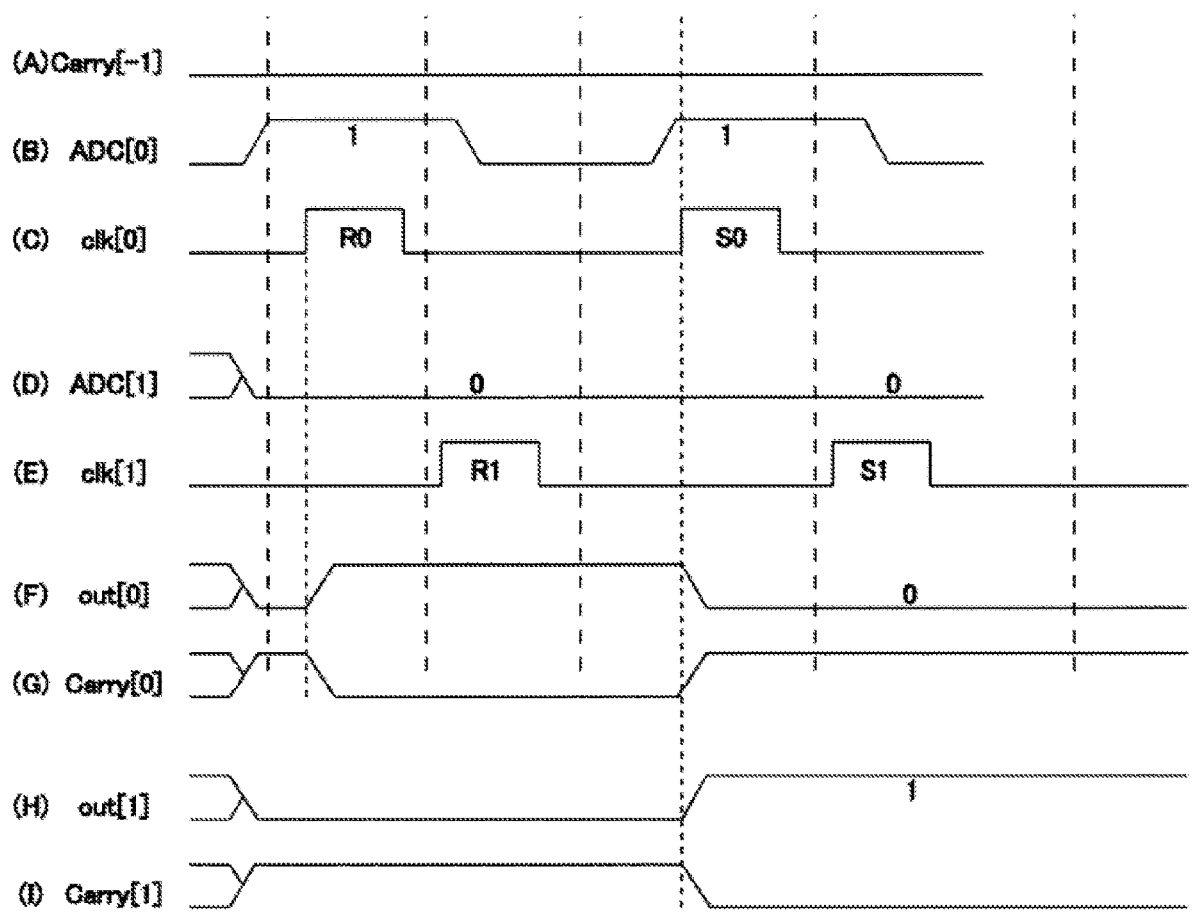
FIG. 18 is a timing chart for illustrating how the respective asynchronous counter modules of FIG. 17 capture a digital pixel signal ADC.

FIG. 18 is a timing chart including parts (A) to (I) for illustrating how the respective asynchronous counter modules of FIG. 17 capture the digital pixel signal ADC. In FIG. 18, the part (A) shows the carry signal Carry[n−1] from the lower-order asynchronous counter module CMJ[0], the part (B) shows the n-bit digital pixel signal ADC[0] fed to the asynchronous counter module CMJ[0], the part (C) shows the capture signal clk[0] used to capture the digital pixel signal ADC[0] fed to the asynchronous counter module CMJ[0], the part (D) shows the n-bit digital pixel signal ADC[1] fed to the asynchronous counter module CMJ[1], the part (E) shows the capture signal clk[1] used to capture the digital pixel signal ADC[1] fed to the asynchronous counter module CMJ[1], the part (F) shows the output signal out[0] from the asynchronous counter module CMJ[0], the part (G) shows the carry signal Carry[0] from the asynchronous counter module CMJ[0], the part (H) shows the output signal out[1] from the asynchronous counter module CMJ[1], and the part (I) shows the carry signal Carry[1] from the asynchronous counter module CMJ[1].

Step ST1:
When the 2-bit digital pixel signal RST ADC[0]=1 fed to the asynchronous counter module CMJ[0] is captured (acquired) in response to the active signal R0 of the capture signal clk[0], the level of the output signal out[0] is inverted from "0" to "1" since the capturing pattern is the capturing pattern PTN2 ("0"→"1").

Step ST2:
When the 2-bit digital pixel signal RST ADC[1]=0 fed to the asynchronous counter module CMJ[1] is captured (acquired) in response to the active signal R1 of the capture signal clk[1], the level of the output signal out[1] remains at "0" since the capturing pattern is the capturing pattern PTN1 ("0"→"0").

Step ST3:
When the 2-bit digital pixel signal SIG ADC[0]=1 fed to the asynchronous counter module CMJ[0] is captured (acquired) in response to the active signal S0 of the capture signal clk[0], the level of the output signal out[0] is again inverted from "1" to "0." In this case, the level of the carry signal Carry[0] transitions from "0" to "1" ("0"→"1"). Accordingly, the level of the output signal out[1] from the asynchronous counter module CMJ[1] is inverted from "0" to "1" ("0"→"1").

Step ST4:
The 2-bit digital pixel signal SIG ADC[1]=0 fed to the asynchronous counter module CMJ[1] is captured (acquired) in response to the active signal S1 of the capture signal clk[1]. Here, the level of the output signal out[1] remains at "1."

On completion of the capturing, the output signal out[1:0]=2b'10, as expected.

As described above, the column reading circuit 40 relating to the first embodiment includes the AD converting part 420 and the calculating part 430. The AD converting part 420 is configured to analog-to-digital convert the read-out reset signal VRST11 and the read-out signal VSIG11 of the analog pixel signal Pixout read to the vertical signal line LSGN into the n-bit digital pixel signal ADC[n] (RST ADC[n] and SIG ADC[n]). The calculating part 430 includes the n-bit asynchronous counter 431 including the retention circuit with the control logic function, which is configured to obtain the difference between the n-bit read-out reset signal and the n-bit read-out signal produced by the AD conversion performed by the AD converting part 420.

The calculating part 430 places the asynchronous counter in the non-operational state, captures, in synchronization with the capture signal clk, each bit of the n-bit read-out reset signal RST ADC [n] produced by the AD conversion performed by the AD converting part 420, and holds each bit in the DFF 460 serving as the retention circuit. Subsequently, the calculating part 430 places the asynchronous counter in the operational state, captures, in synchronization with the capture signal clk, each bit of the n-bit read-out signal SIGADC[n] produced by the AD conversion performed by the AD converting part 420, adds the captured read-out signal SIGADC[n] to the read-out reset signal RSTADC[n] held in the DFF 460 serving as the retention circuit, performs counting and performs an operation (SIG−RST) between the negative version of the read-out reset signal and the positive version of the read-out signal.

As for this operation, if the outputs from the AD converting part are added together as they are, the operation (RST+SIG) is performed. To overcome this issue, in the first embodiment, the column reading circuit includes the signal inverting part 440 for inverting the read-out reset signal RSTADC to obtain −RST ADC so that the operation (SIG−RST) can be performed. The signal inverting part 440 is arranged after the output part of the AD converting part and before the input part of the retention circuit and configured to invert the n-bit read-out reset signal RSTADC produced by the AD conversion.

In the manner described above, the first embodiment can reduce the memory circuits of the column read-out system, so that the column reading system can achieve a reduced layout area and eventually a reduced size.

Second Embodiment

Figure 19:
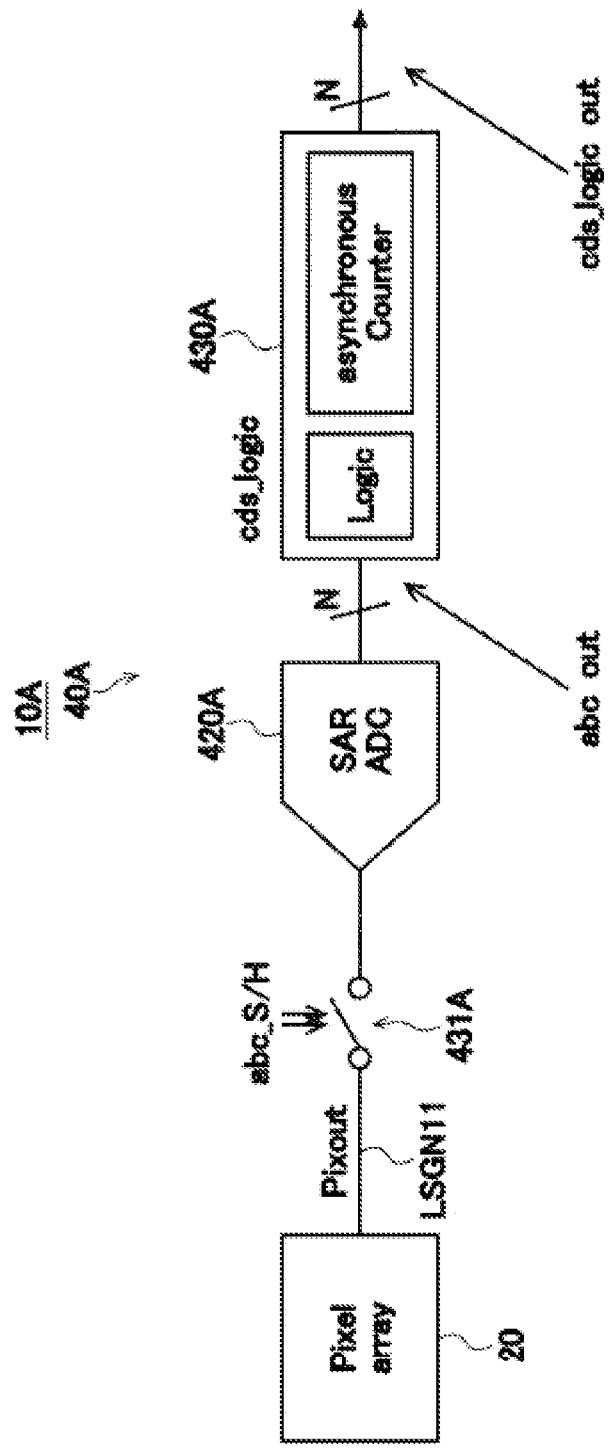
FIG. 19 shows a basic example configuration of a column reading system relating to a second embodiment of the present invention.
Figure 20:
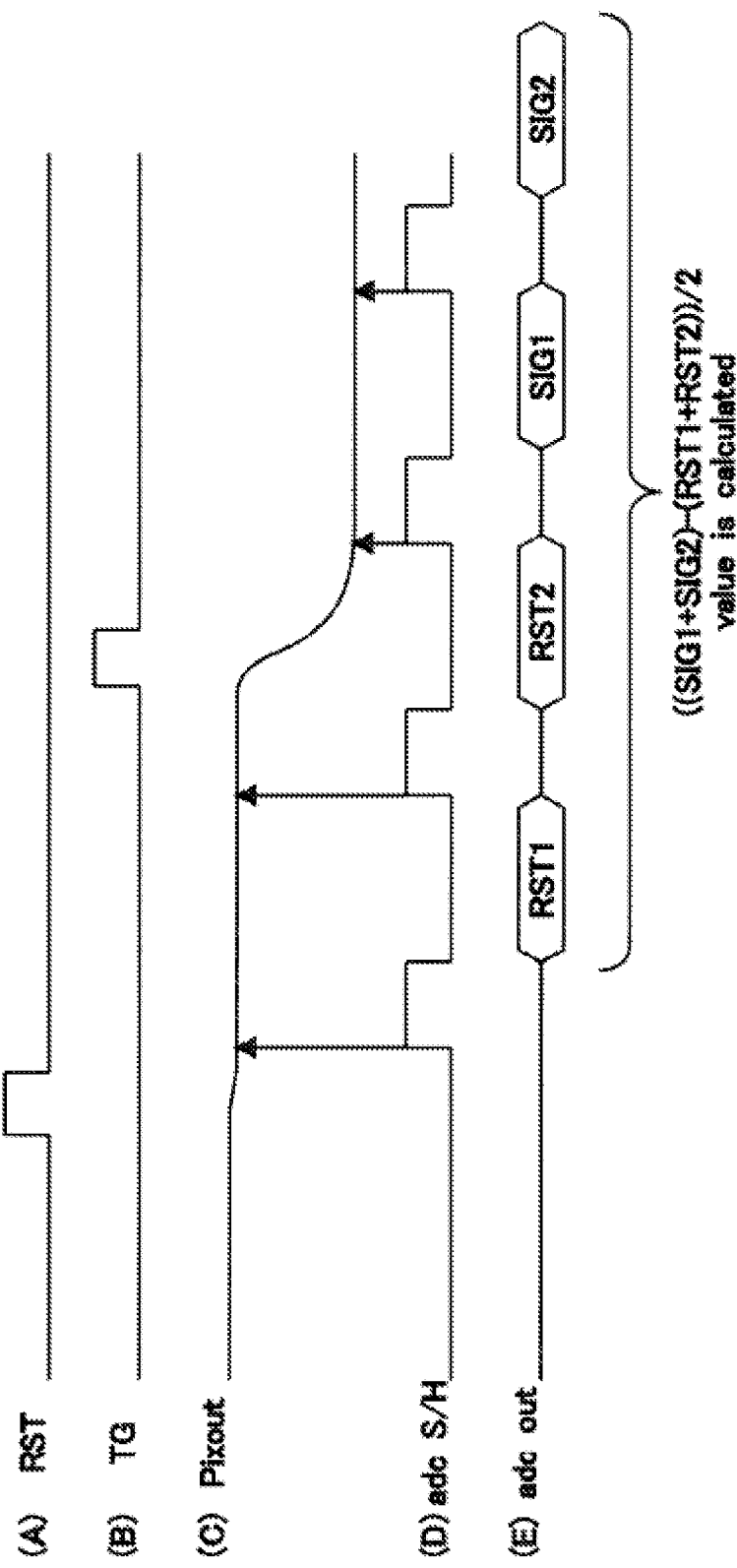
FIG. 20 is used to illustrate how a column reading system of a solid-state imaging device relating to the second embodiment of the present invention performs a reading operation.
Figure 21:
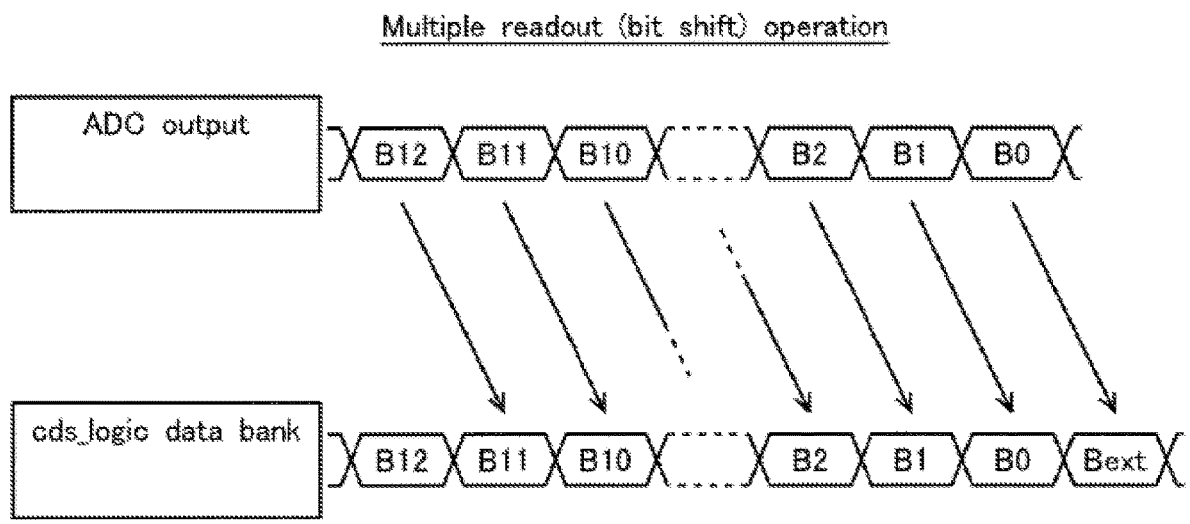
FIG. 21 is used to illustrate how to divide a digital signal by the number of samples when a read-out reset signal and a read-out signal read from pixels are sampled multiple times.

FIG. 19 shows a basic example configuration of a column read-out system relating to a second embodiment of the present invention. FIG. 20 includes parts (A) to (E) and is used to illustrate how the column reading system of a solid-state imaging device relating to the second embodiment of the present invention performs reading. FIG. 21 is used to illustrate how to divide a digital signal by the number of samples when the read-out reset signal and the read-out signal read from the pixel are sampled multiple times.

A solid-state imaging device 10A relating to the second embodiment differs from the solid-state imaging device 10 relating to the above-described first embodiment in the following points.

In the column reading circuit 40 of the solid-state imaging device 10 relating to the first embodiment, the read-out reset signal VRST11 and the read-out signal VSIG read from the pixel are each sampled at the switch 410 once and the samples are captured (acquired) by the AD converting part 420.

In a column reading circuit 40A of the solid-state imaging device 10A of the second embodiment, on the other hand, the read-out reset signal VRST11 and the read-out signal VSIG of the pixel signal read onto the vertical signal line LSGN11 are each sampled and held multiple times, for example, twice, and the samples are then captured by the AD converting part 420A, so that the pixel signal can be read with reduced noise. A calculating part 430A divides, by two or the number of samples, the two digital read-out reset signals and the two read-out signals, which are used to obtain the difference between the n-bit read-out reset signal RSTADC and the n-bit read-out signal SIGADC produced by the AD conversion performed by the AD converting part 420A.

In the second embodiment, the reading circuit 40A performs the division by two or the number of samples by performing bit shifting by one bit when the asynchronous counter modules CMJ capture the digital pixel signal.

If the read-out reset signal VRST11 is sampled twice and the read-out signal VSIG11 is sampled twice, and the results are divided by two or the number of samples as described above, the noise component is reduced to 1/sqrt(2). The read-out reset signal VRST11 and the read-out signal VSIG11 are divided by two by the calculating part 430A capturing the signals with bit shifting by one bit, as shown in FIG. 21.

The second embodiment can not only produce the same effects as the above-described first embodiment, but also can advantageously read the pixel signals with further reduced noise.

The solid-state imaging devices 10 and 10A described above can be applied, as an imaging device, to electronic apparatuses such as digital cameras, video cameras, mobile terminals, surveillance cameras, and medical endoscope cameras.

Figure 22:
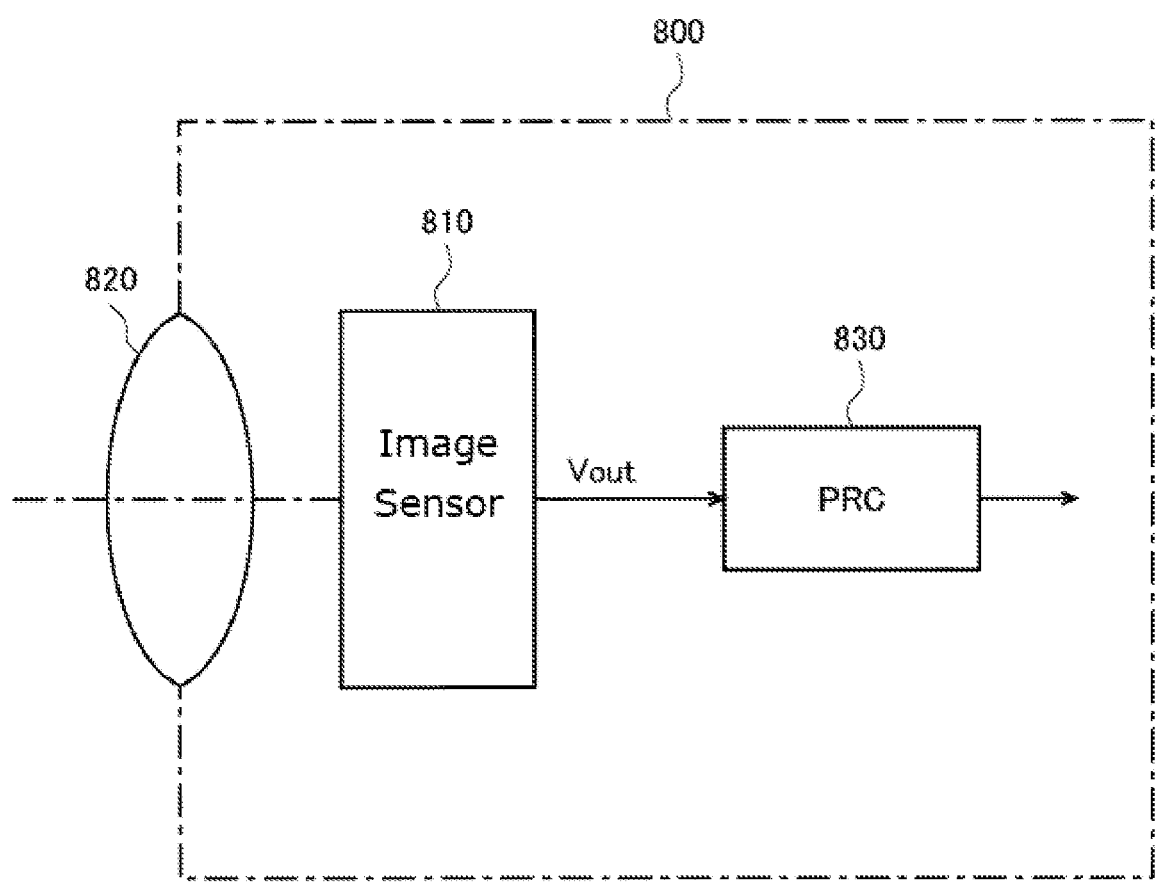
FIG. 22 shows an example configuration of an electronic apparatus to which the solid-state imaging devices relating to the embodiments of the present invention can be applied.

FIG. 22 shows an example configuration of an electronic apparatus including a camera system to which the solid-state imaging devices according to the embodiments of the present invention can be applied.

As shown in FIG. 22, the electronic apparatus 800 includes a CMOS image sensor 310 that can be constituted by any of the solid-state imaging devices 10 and 10A relating to the embodiments of the present invention. The electronic apparatus 800 further includes an optical system (such as a lens) 820 for redirecting the incident light to the pixel region of the CMOS image sensor 810 (to form a subject image). The electronic apparatus 800 includes a signal processing circuit (PRC) 830 for processing the output signals from the CMOS image sensor 810.

The signal processing circuit 830 performs predetermined signal processing on the output signals from the CMOS image sensor 810. The image signals resulting from the processing in the signal processing circuit 830 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes the solid-state imaging device 10 or 10A as the CMOS image sensor 810. Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising:
a pixel part having pixels arranged in a matrix pattern, each pixel being configured to perform photoelectric conversion; and
a reading circuit having an analog-to-digital (AD) conversion function for analog-to-digital converting a pixel signal read out from the each pixel onto a signal line as a voltage signal,
wherein the pixel signal read out from the each pixel includes a read-out reset signal and a read-out signal sequentially read from the each pixel,
wherein the reading circuit includes:
an AD converting part for analog-to-digital converting the read-out reset signal and the read-out signal included in the pixel signal read onto the signal line into an n-bit digital pixel signal; and
a calculating part including an n-bit asynchronous counter having a retention circuit with a control logic function for obtaining a difference between an n-bit read-out reset signal and an n-bit read-out signal produced by the AD conversion performed by the AD converting part, and
wherein the calculating part:
places the asynchronous counter in a non-operational state, captures, in synchronization with a capture signal, each bit of the n-bit read-out reset signal produced by the AD conversion performed by the AD converting part, and holds the read-out reset signal in the retention circuit; and
subsequently places the asynchronous counter in an operational state, captures, in synchronization with a capture signal, each bit of the n-bit read-out signal produced by the AD conversion performed by the AD converting part, adds the captured read-out signal to the read-out reset signal held in the retention circuit, performs counting and performs an operation between a negative version of the read-out reset signal and a positive version of the read-out signal, wherein the calculating part includes n asynchronous counter modules arranged in a one-to-one correspondence with bits of the digital pixel signal including the n-bit read-out reset signal and the n-bit read-out signal, wherein the asynchronous counter modules are connected in cascade through a carry signal input/output line, wherein each of the asynchronous counter modules includes:
  a logic circuit; and
  a D flip-flop serving as the retention circuit for performing an operation in response to a clock signal from the logic circuit,
    wherein the logic circuit is configured to generate the clock signal based on the digital pixel signal captured in response to the capture signal and on a logical operation associated with a carry signal from a lower-order one of the asynchronous counter modules,
    wherein, in the D flip-flop, a data output Q is connected to a signal output terminal, a data inverting output terminal QB is connected to a data input D of the D flip-flop and to a carry signal output terminal connected to a carry signal input terminal of a higher-order one of the asynchronous counter modules, and
    a clock terminal is connected to a clock signal output terminal of the logic circuit.

2. The solid-state imaging device of claim 1, comprising a signal inverting part arranged after an output part of the AD converting part and before an input part of the retention circuit, the signal inverting part being configured to invert the n-bit read-out reset signal produced by the AD conversion.

3. The solid-state imaging device of claim 1,
wherein each of the asynchronous counter modules includes:
a pixel signal input terminal to which a corresponding one of bits of the read-out reset signal and a corresponding one of bits of the read-out signal are input;
a capture signal input terminal to which a capture signal is input to capture the corresponding one of the bits of the read-out reset signal and the corresponding one of the bits of the read-out signal are input;
a carry signal input terminal;
a signal output terminal;
a carry signal output terminal;
a first logic gate for performing a logical operation between (i) the read-out reset signal or the read-out signal fed to a first input terminal and (ii) the capture signal, to produce a first signal corresponding to the read-out reset signal or the read-out signal;
a second logic gate for performing a logical operation between (i) the read-out reset signal or the read-out signal fed to a first input terminal and (ii) the capture signal, to invert a level of the read-out reset signal or the read-out signal and produce a second signal having a reversed phase when compared with the first signal;
a third logic gate for performing a logical operation between the second signal from the second logic gate and a carry signal from a lower-order one of the asynchronous counter modules input through the carry signal input terminal, to produce a third signal;
a fourth logic gate for performing a logical NOR between the first signal and the third signal, to produce a fourth signal; and
a fifth logic gate for inverting the fourth signal from the fourth logic gate, to produce a clock signal,
wherein, in the D flip-flop, a data output Q is connected to the signal output terminal, a data inverting output terminal QB is connected to a data input D of the D flip-flop and to the carry signal output terminal, a clock terminal is connected to a clock signal output terminal of the fifth logic gate,
wherein the carry signal input terminal is connected to a carry output terminal of a lower-order one of the asynchronous counter modules, and
wherein the carry signal output terminal is connected to a carry signal input terminal of a higher-order one of the asynchronous counter modules.

4. The solid-state imaging device of claim 1,
wherein, when the capture signal is active, each of the asynchronous counter modules captures the digital pixel signal following any one of four capturing patterns:
PTN 1 represented as Carry[n−1]=0/ADC[n]=0;
PTN 2 represented as Carry[n−1]=0/ADC[n]=1;
PTN 3 represented as Carry[n−1]=1/ADC[n]=0; and
PTN 4 represented as Carry[n−1]=1/ADC[n]=1,
with Carry[n−1] representing a carry signal from a lower-order one of the asynchronous counter modules, ADC[n] representing the digital pixel signal produced by the AD converting part, and "1" and "0" respectively representing digital HIGH and digital LOW.

5. The solid-state imaging device of claim 4, wherein, in each of the asynchronous counter modules, an output signal out[n] and a carry output signal Carry[n] are inverted when the captured digital pixel signal ADC[n] produced by the AD converting part is represented by 1.

6. The solid-state imaging device of claim 4, wherein each of the asynchronous counter modules keeps values unchanged when the captured digital pixel signal ADC[n] produced by the AD converting part is represented by 0.

7. The solid-state imaging device of claim 4, wherein, if a level of a carry signal Carry[n−1] from a lower-order one of the asynchronous counter modules is inverted from "0" to "1" when a (n−1)-th bit is captured, a toggle transfers to a clock signal of the asynchronous counter module for an n-th bit, so that data of the n-th bit is also inverted and count-up is performed.

8. The solid-state imaging device of claim 1,
wherein the reading circuit samples the read-out reset signal and the read-out signal included in the pixel signal read onto the signal line respectively a plurality of times and captures the read-out reset signal and the read-out signal at the AD converting part, and
wherein the calculating part divides, by the number of samples, a plurality of digital read-out reset signals and a plurality of read-out signals, which are used to obtain a difference between the n-bit read-out reset signal and the n-bit read-out signal produced by the AD conversion performed by the AD converting part.

9. The solid-state imaging device of claim 8, wherein the reading circuit performs the division by the number of samples by performing bit shifting when the asynchronous counter modules capture the digital pixel signal.

10. The solid-state imaging device of claim 9,
wherein the reading circuit:
   performs the sampling twice; and
   performs the division by two or the number of samples by performing bit shifting by one bit when the asynchronous counter modules capture the digital pixel signal.

11. A method for driving a solid-state imaging device comprising:
   arranging a pixel part having pixels in a matrix pattern, each pixel being configured to perform photoelectric conversion; and
   providing a reading circuit having an analog-to-digital (AD) conversion function for analog-to-digital converting a pixel signal read out from the each pixel onto a signal line as a voltage signal,
   wherein the pixel signal read out from the each pixel includes a read-out reset signal and a read-out signal sequentially read from the each pixel,
   wherein the reading circuit includes:
      an AD converting part for analog-to-digital converting the read-out reset signal and the read-out signal included in the pixel signal read onto the signal line into an n-bit digital pixel signal; and
      a calculating part including an n-bit asynchronous counter having a retention circuit with a control logic function for obtaining a difference between an n-bit read-out reset signal and an n-bit read-out signal produced by the AD conversion performed by the AD converting part, and
      wherein the calculating part:
         places the asynchronous counter in a non-operational state, captures, in synchronization with a capture signal, each bit of the n-bit read-out reset signal produced by the AD conversion performed by the AD converting part, and holds the read-out reset signal in the retention circuit; and
         subsequently places the asynchronous counter in an operational state, captures, in synchronization with a capture signal, each bit of the n-bit read-out signal produced by the AD conversion performed by the AD converting part, adds the captured read-out signal to the read-out reset signal held in the retention circuit, performs counting and performs an operation between a negative version of the read-out reset signal and a positive version of the read-out signals,
      wherein the calculating part includes n asynchronous counter modules arranged in a one-to-one correspondence with bits of the digital pixel signal including the n-bit read-out reset signal and the n-bit read-out signal,
      wherein the asynchronous counter modules are connected in cascade through a carry signal input/output line,
      wherein each of the asynchronous counter modules includes:
         a logic circuit; and
         a D flip-flop serving as the retention circuit for performing an operation in response to a clock signal from the logic circuit,
         wherein the logic circuit is configured to generate the clock signal based on the digital pixel signal captured in response to the capture signal and on a logical operation associated with a carry signal from a lower-order one of the asynchronous counter modules,
         wherein, in the D flip-flop, a data output Q is connected to a signal output terminal, a data inverting output terminal QB is connected to a data input D of the D flip-flop and to a carry signal output terminal connected to a carry signal input terminal of a higher-order one of the asynchronous counter modules, and
         a clock terminal is connected to a clock signal output terminal of the logic circuit.

12. An electronic apparatus comprising:
   a solid-state imaging device; and
   an optical system for forming a subject image on the solid-state imaging device,
   wherein the solid-state imaging device includes:
      a pixel part having pixels arranged in a matrix pattern, each pixel being configured to perform photoelectric conversion; and
      a reading circuit having an analog-to-digital (AD) conversion function for analog-to-digital converting a pixel signal read out from the each pixel onto a signal line as a voltage signal,
      wherein the pixel signal read out from the each pixel includes a read-out reset signal and a read-out signal sequentially read from the each pixel,
      wherein the reading circuit includes:
         an AD converting part for analog-to-digital converting the read-out reset signal and the read-out signal included in the pixel signal read onto the signal line into an n-bit digital pixel signal; and
         a calculating part including an n-bit asynchronous counter having a retention circuit with a control logic function for obtaining a difference between an n-bit read-out reset signal and an n-bit read-out signal produced by the AD conversion performed by the AD converting part, and
         wherein the calculating part:
            places the asynchronous counter in a non-operational state, captures, in synchronization with a capture signal, each bit of the n-bit read-out reset signal produced by the AD conversion performed by the AD converting part, and holds the read-out reset signal in the retention circuit; and
            subsequently places the asynchronous counter in an operational state, captures, in synchronization with a capture signal, each bit of the o-bit read-out signal produced by the AD conversion performed by the AD converting part, adds the captured read-out signal to the read-out reset signal held in the retention circuit, performs counting and performs an operation between a negative version of the read-out reset signal and a positive version of the read-out signal,
         wherein the calculating part includes n asynchronous counter modules arranged in a one-to-one correspondence with bits of the digital pixel signal including the n-bit read-out reset signal and the n-bit read-out signal,
         wherein the asynchronous counter modules are connected in cascade through a carry signal input/output line,
         wherein each of the asynchronous counter modules includes:
            a logic circuit; and
            a D flip-flop serving as the retention circuit for performing an operation in response to a clock signal from the logic circuit, wherein the logic circuit is configured to generate the clock signal based on the digital pixel signal captured in response to the capture signal and on a logical operation associated with a carry signal from a lower-order one of the asynchronous counter modules, wherein, in the D flip-flop, a data output Q is connected to a signal output terminal, a data inverting output terminal QB is connected to a data input D of the D flip-flop and to a carry signal output terminal connected to a carry signal input terminal of a higher-order one of the asynchronous counter modules, and a clock terminal is connected to a clock signal output terminal of the logic circuit.

* * * * *